United States Patent
Nakaki et al.

(10) Patent No.: US 10,133,121 B2
(45) Date of Patent: Nov. 20, 2018

(54) LIGHT-EMITTING DEVICE, DISPLAY APPARATUS, AND LIGHTING APPARATUS

(71) Applicant: Sony Corporation, Tokyo (JP)

(72) Inventors: Kenichi Nakaki, Tokyo (JP); Kenji Kobayashi, Kanagawa (JP); Hiroki Asakawa, Aichi (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 15/570,144

(22) PCT Filed: Mar. 29, 2016

(86) PCT No.: PCT/JP2016/060178
§ 371 (c)(1),
(2) Date: Oct. 27, 2017

(87) PCT Pub. No.: WO2016/185805
PCT Pub. Date: Nov. 24, 2016

(65) Prior Publication Data
US 2018/0136521 A1 May 17, 2018

(30) Foreign Application Priority Data

May 15, 2015 (JP) .................. 2015-100426

(51) Int. Cl.
*G02F 1/1335* (2006.01)
*F21S 2/00* (2016.01)
(Continued)

(52) U.S. Cl.
CPC .......... *G02F 1/133611* (2013.01); *F21S 2/00* (2013.01); *F21V 7/00* (2013.01);
(Continued)

(58) Field of Classification Search
CPC ......... G02F 1/133611; G02F 1/133603; G02F 1/133605; G02F 2203/01; F21V 7/00;
(Continued)

(56) References Cited

U.S. PATENT DOCUMENTS

2006/0203464 A1  9/2006  Kang et al.
2006/0245208 A1* 11/2006  Sakamoto ......... G02F 1/133603
                                                362/612
2009/0257215 A1* 10/2009  Gomi ................ G02F 1/133605
                                                362/97.1

FOREIGN PATENT DOCUMENTS

JP      2006253141 A    9/2006
JP      2011181219 A    9/2011
(Continued)

OTHER PUBLICATIONS

International Search Report from PCT/JP2016/060178, dated Jun. 28, 2016, 2 pgs.

*Primary Examiner* — Nathanel R Briggs
*Assistant Examiner* — William Peterson
(74) *Attorney, Agent, or Firm* — Lerner, David, Littenberg, Krumholz & Mentlik, LLP

(57) ABSTRACT

There is provided a light-emitting device that exhibits superior luminance contribution rate of a light source while reducing in-plane luminance unevenness despite a simple configuration. The light-emitting device includes: a substrate on which one or more light sources are provided; and a reflective plate placed on the substrate. The reflective plate includes: an opening into which the light source is inserted; a sloped section that is sloped relative to the substrate while surrounding the opening, and has a first thickness; and a top surface section that is coupled to a top end of the sloped section, and has a second thickness. The first thickness is greater than the second thickness.

11 Claims, 22 Drawing Sheets

(51) Int. Cl.
  *F21V 7/00*   (2006.01)
  *F21V 7/04*   (2006.01)
  *F21V 7/22*   (2018.01)
  *F21V 13/02*  (2006.01)
  *F21V 19/00*  (2006.01)

(52) U.S. Cl.
  CPC .................. *F21V 7/04* (2013.01); *F21V 7/22* (2013.01); *F21V 13/02* (2013.01); *F21V 19/00* (2013.01); *G02F 1/133603* (2013.01); *G02F 1/133605* (2013.01); *G02F 2203/01* (2013.01)

(58) Field of Classification Search
  CPC ... F21V 7/04; F21V 7/22; F21V 13/02; F21V 19/00; F21S 2/00
  USPC .......................................................... 349/67
  See application file for complete search history.

(56) References Cited

FOREIGN PATENT DOCUMENTS

| | | |
|---|---|---|
| JP | 2012027382 A | 2/2012 |
| JP | 2012181949 A | 9/2012 |

\* cited by examiner

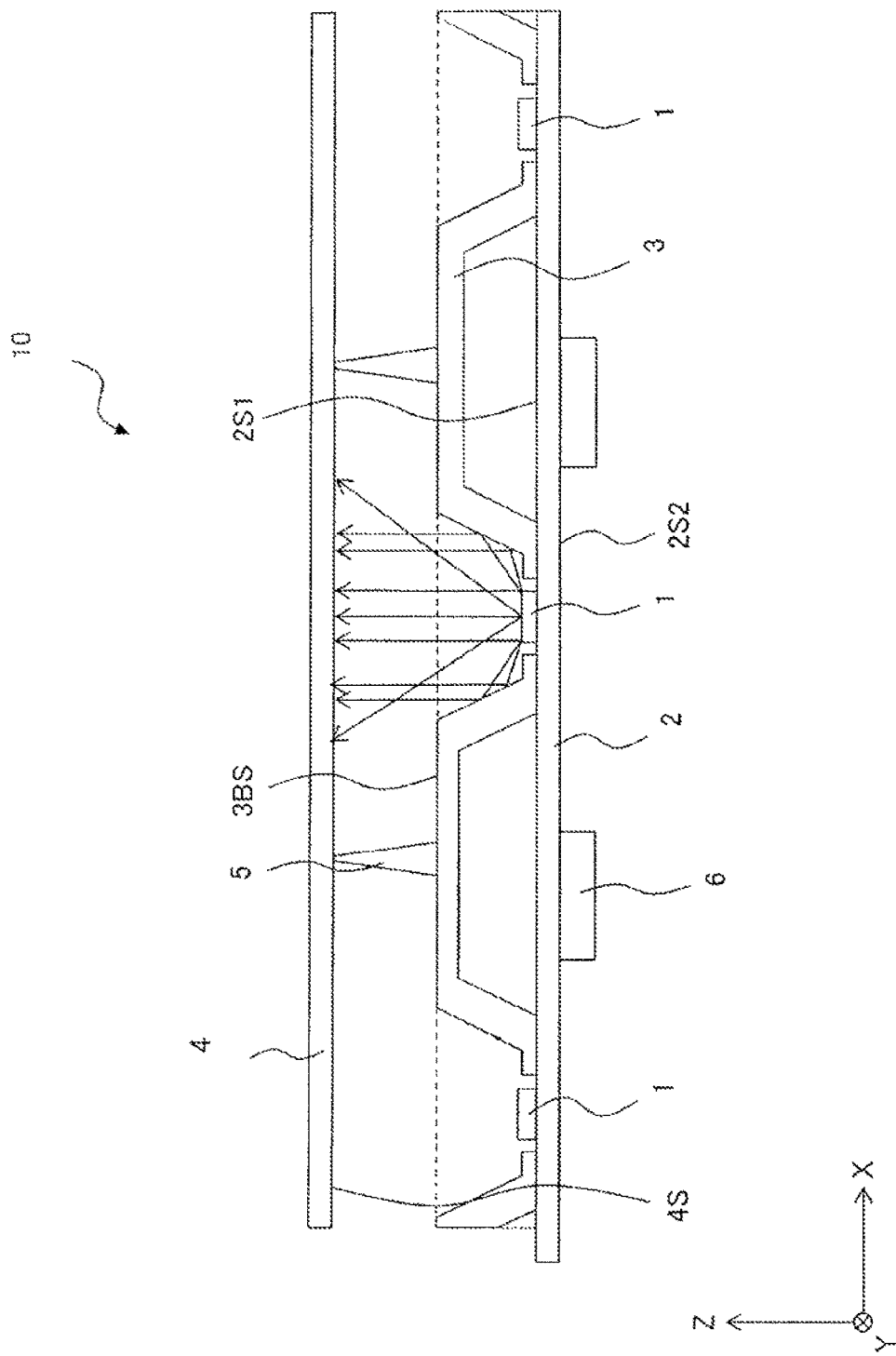

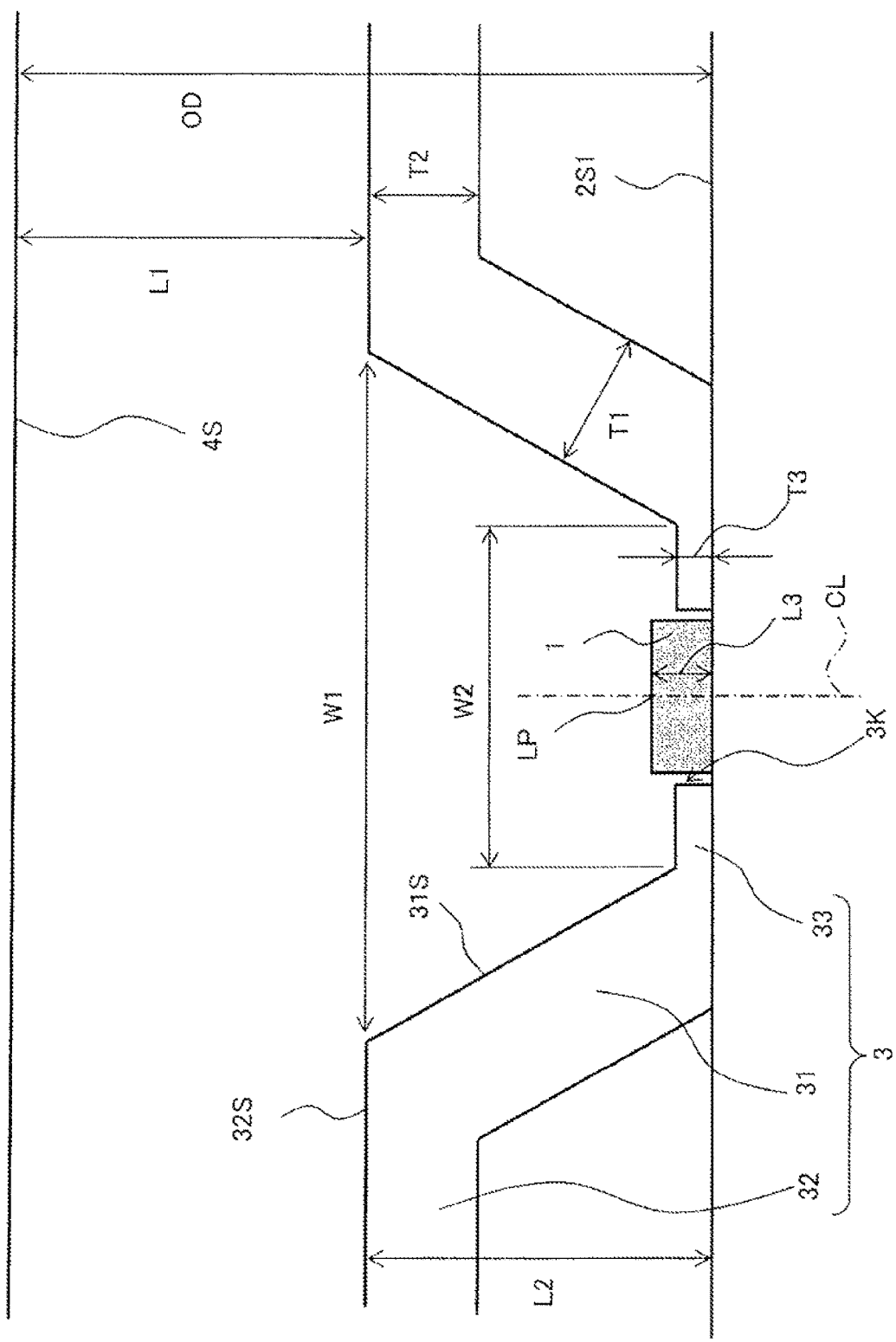
[FIG. 2]

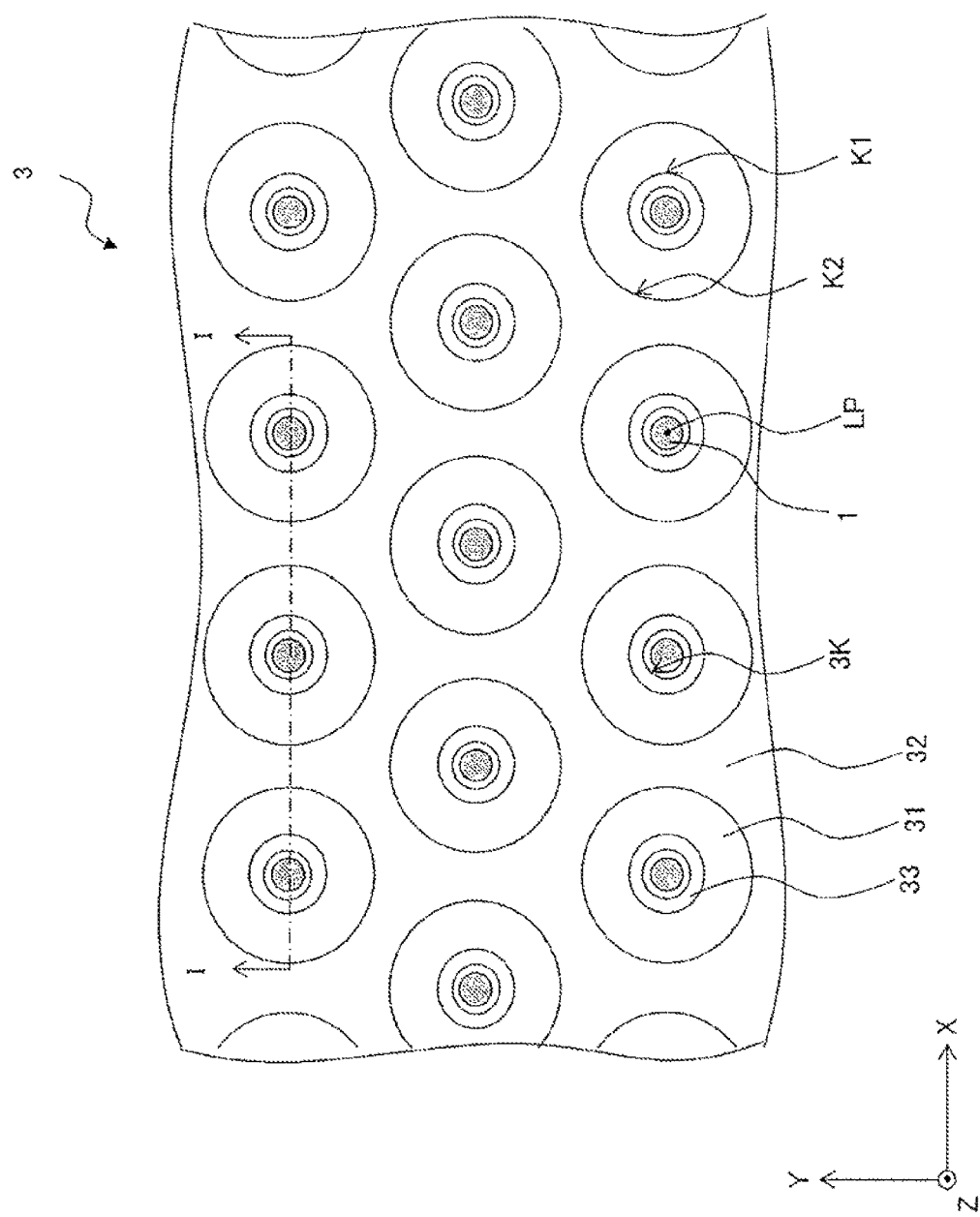
[FIG. 3]

[ FIG. 4 ]
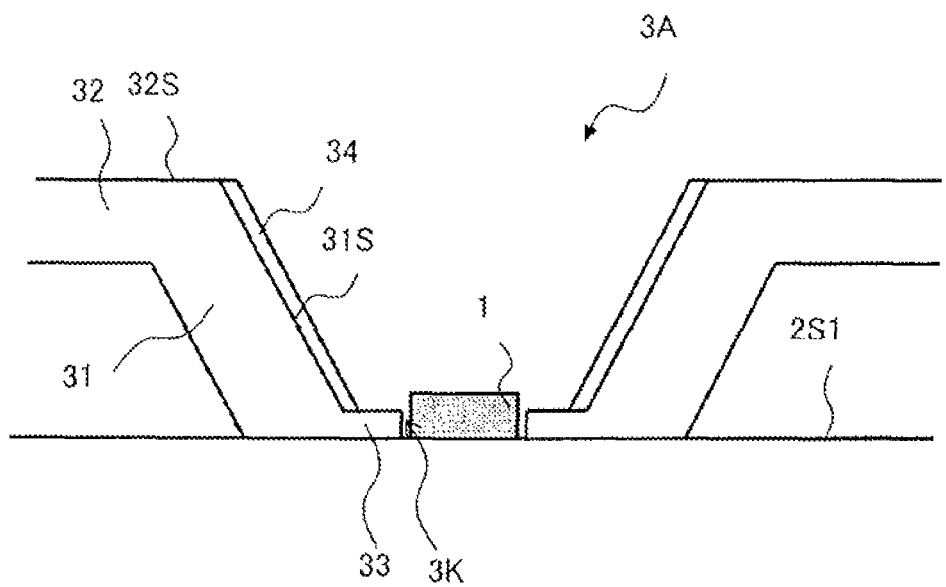
[ FIG. 5 ]
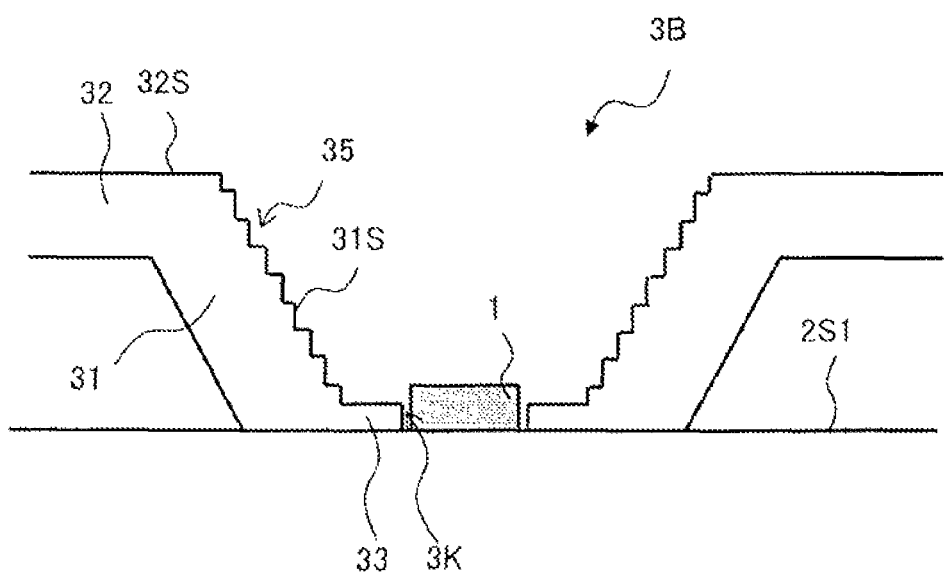

[ FIG. 6A ]
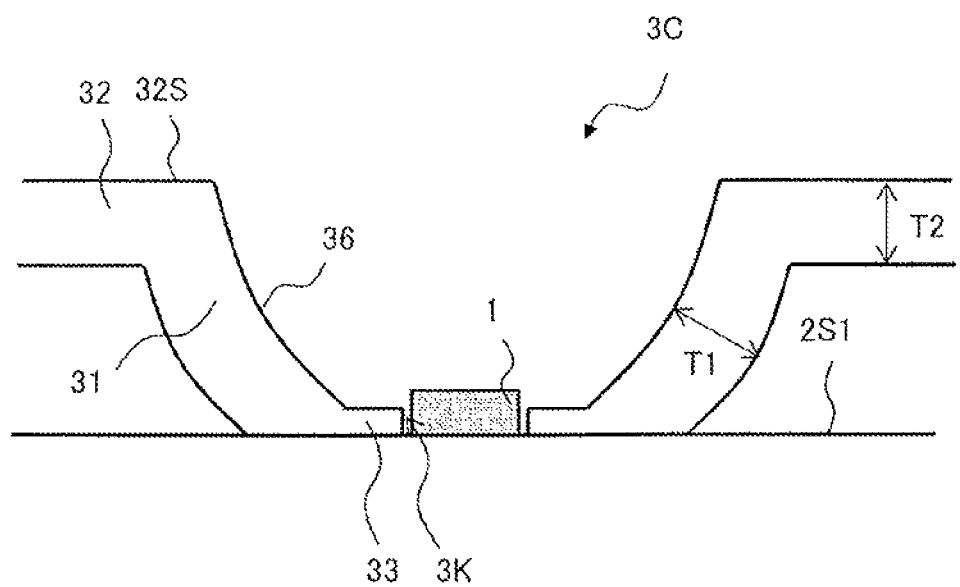
[ FIG. 6B ]
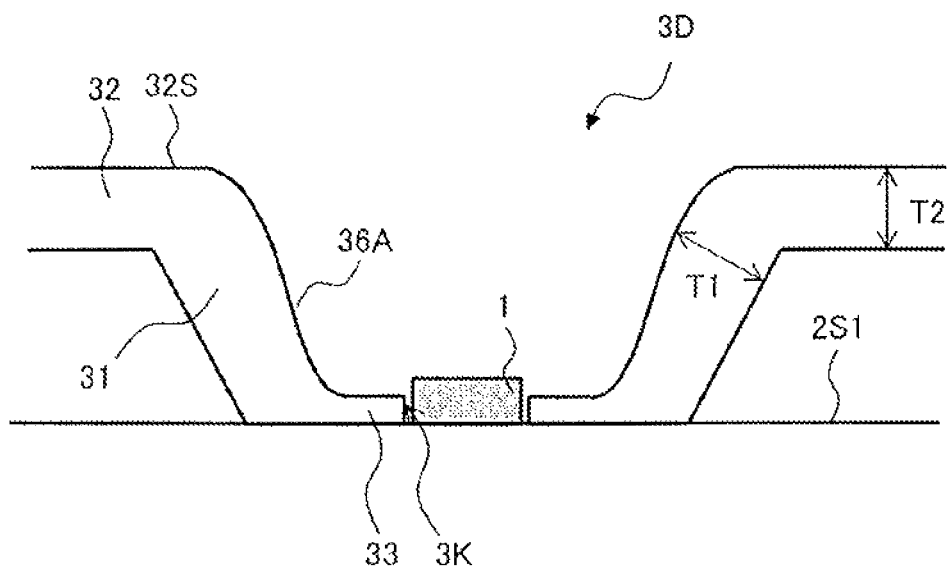

[ FIG. 7A ]
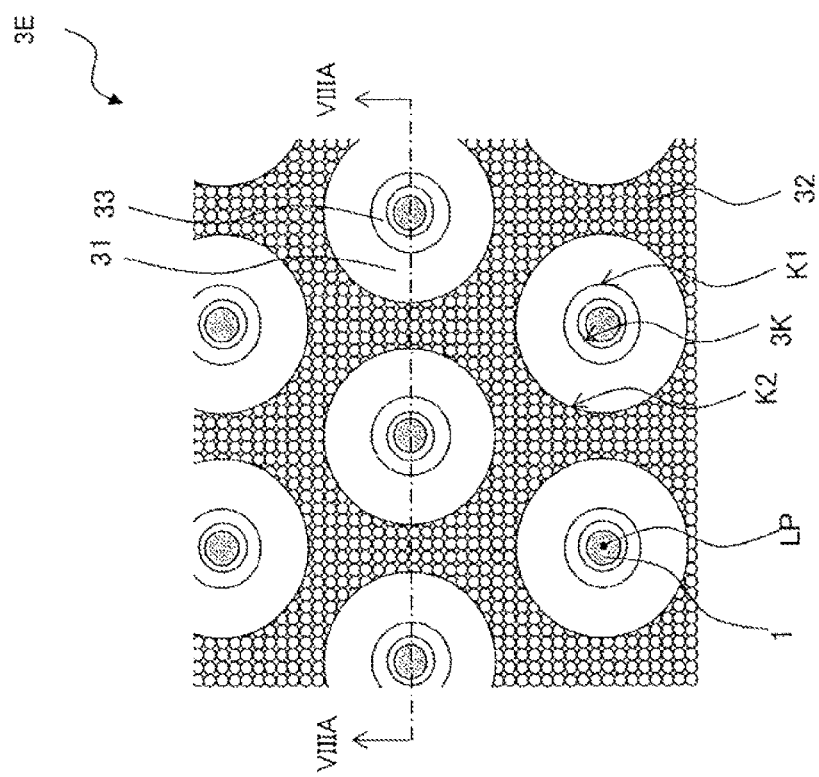

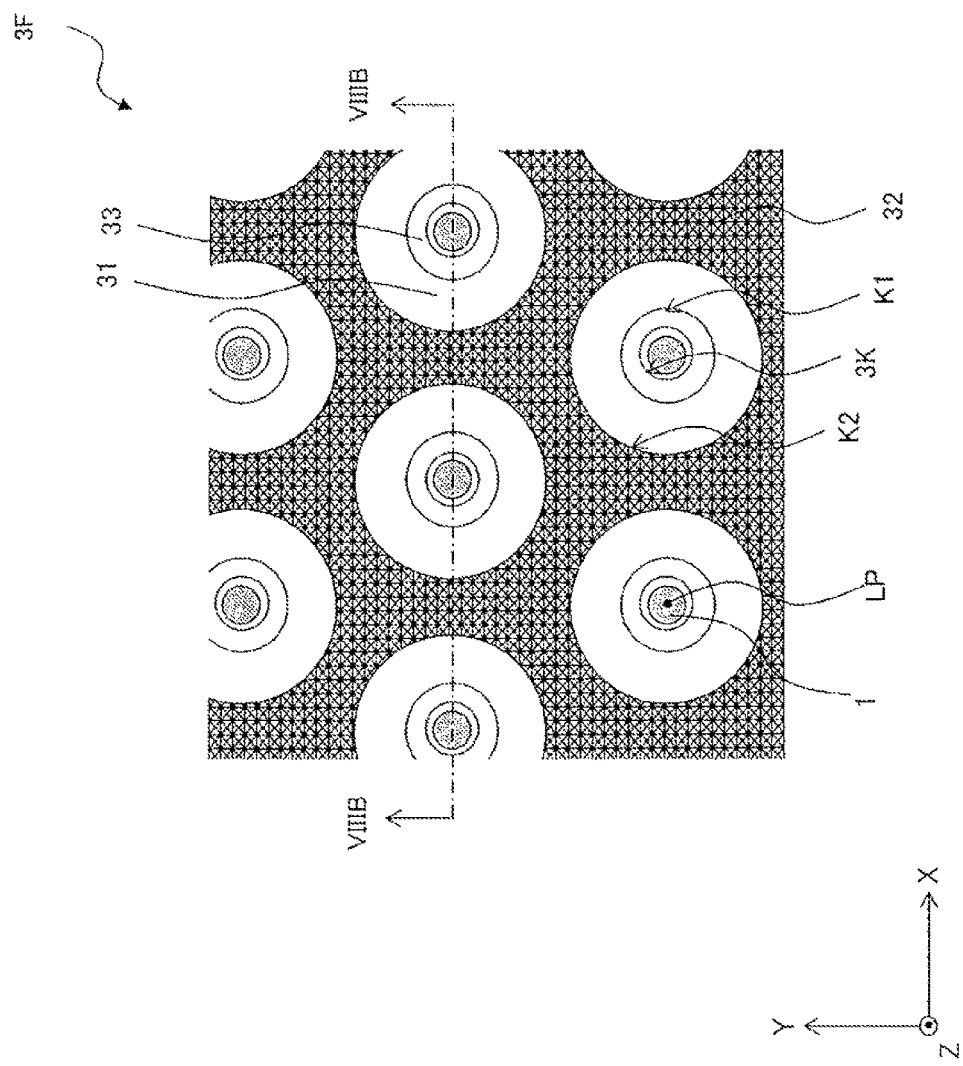
[ FIG. 7B ]

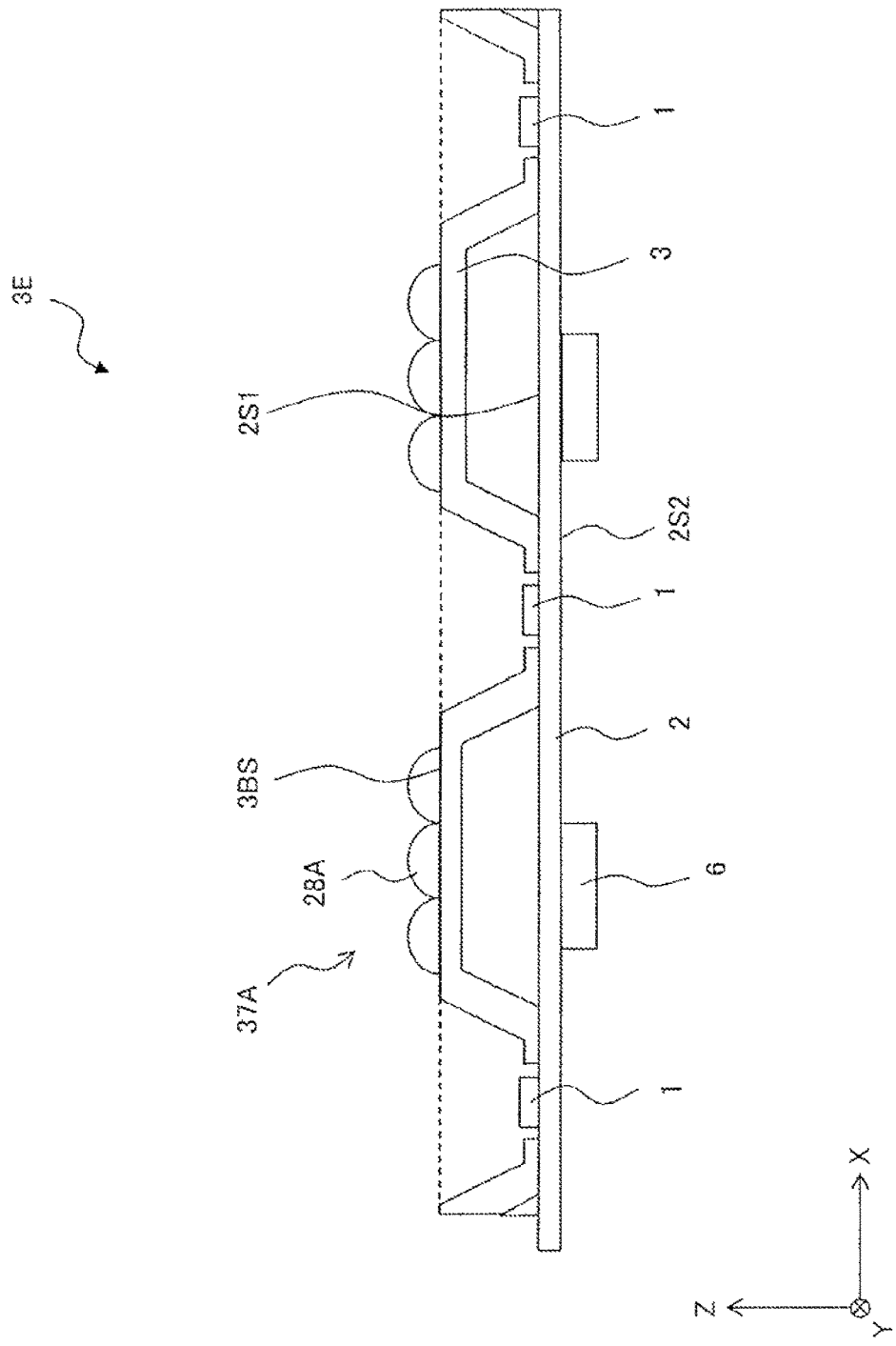
[FIG. 8A]

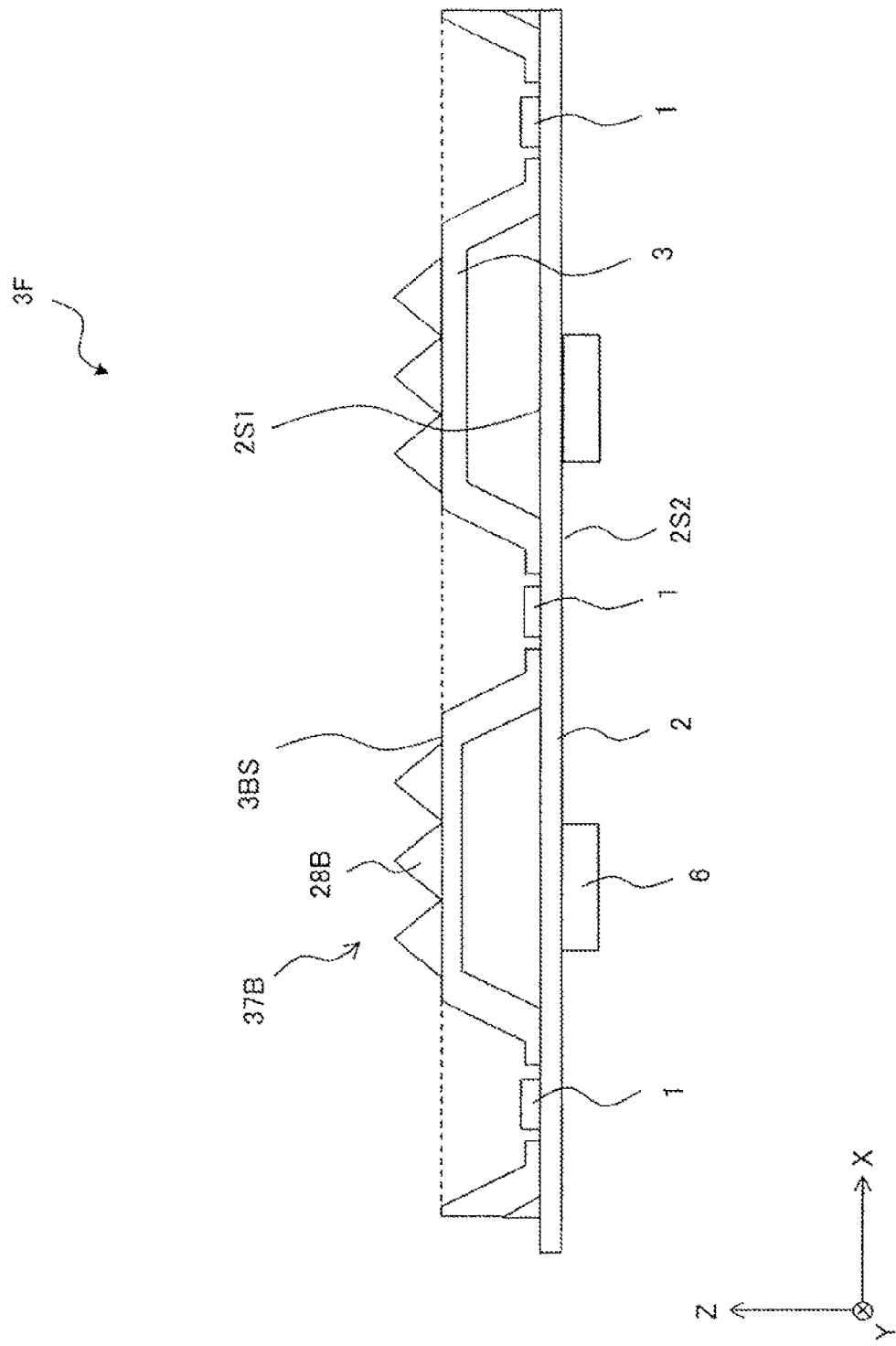
[FIG. 8B]

[ FIG. 9 ]
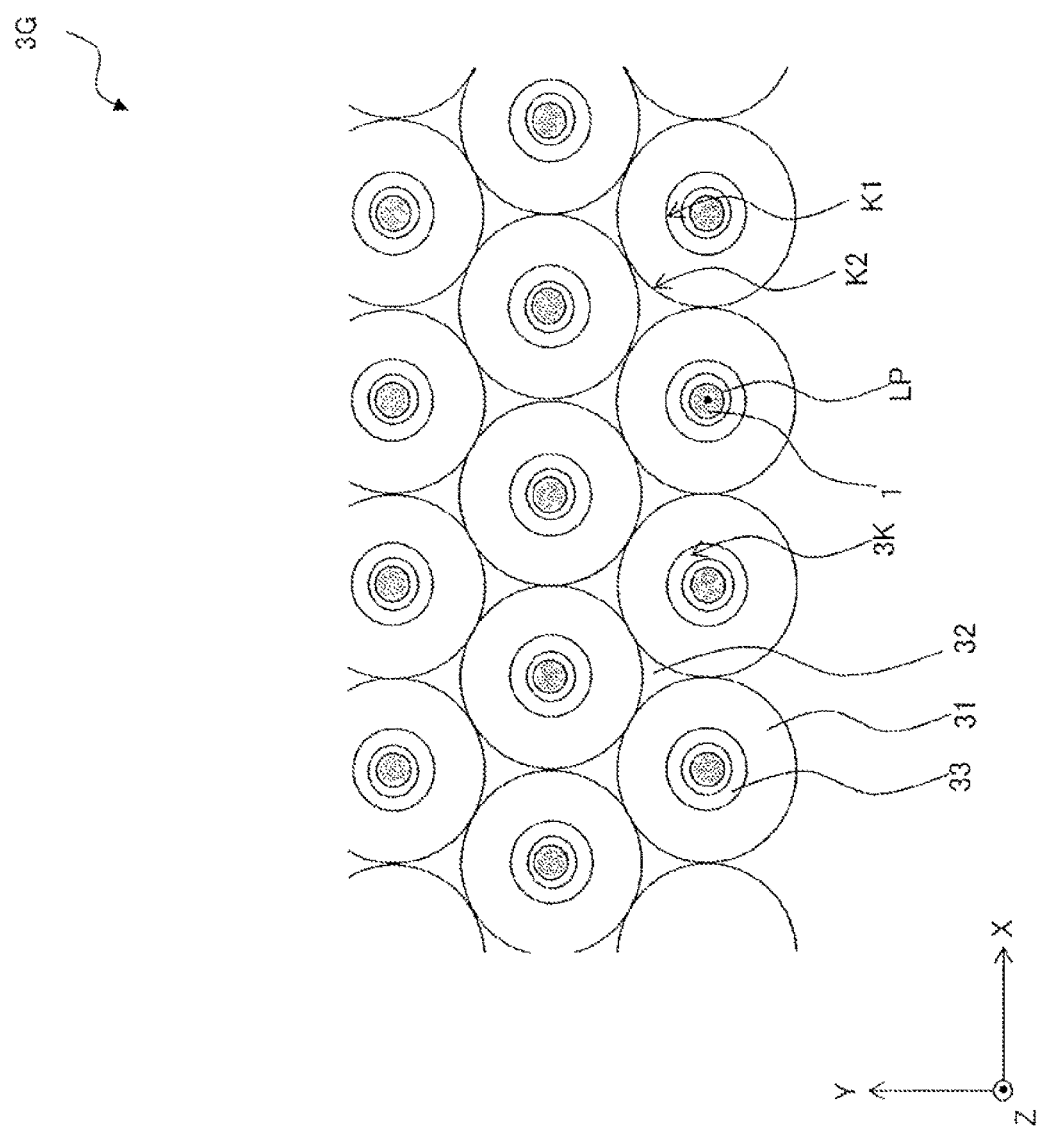

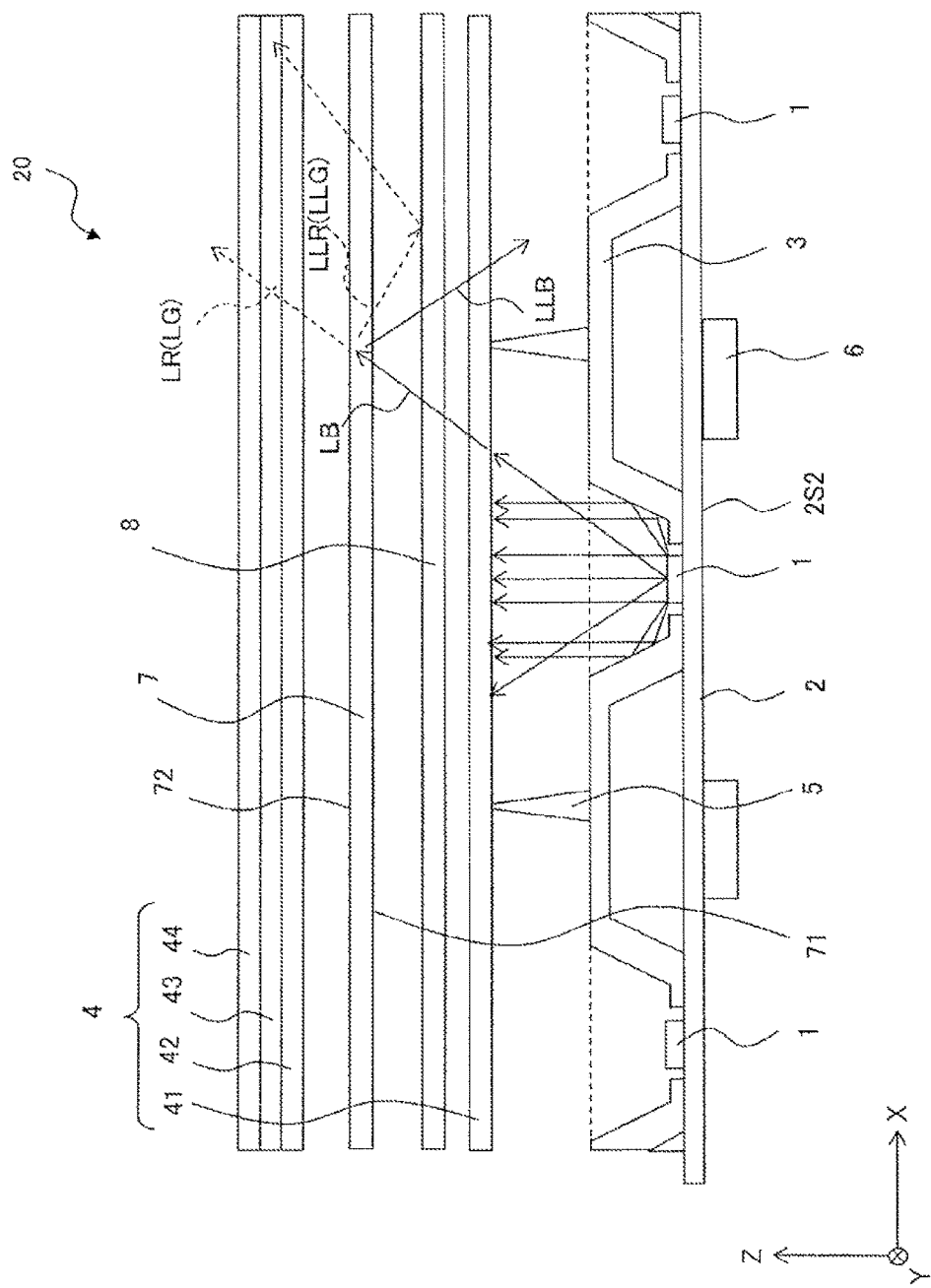
[FIG. 10]

[ FIG. 11 ]
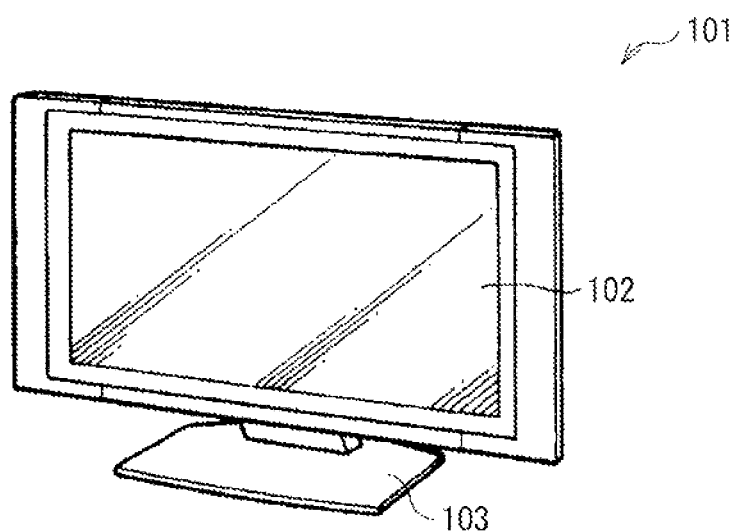

[ FIG. 12A ]
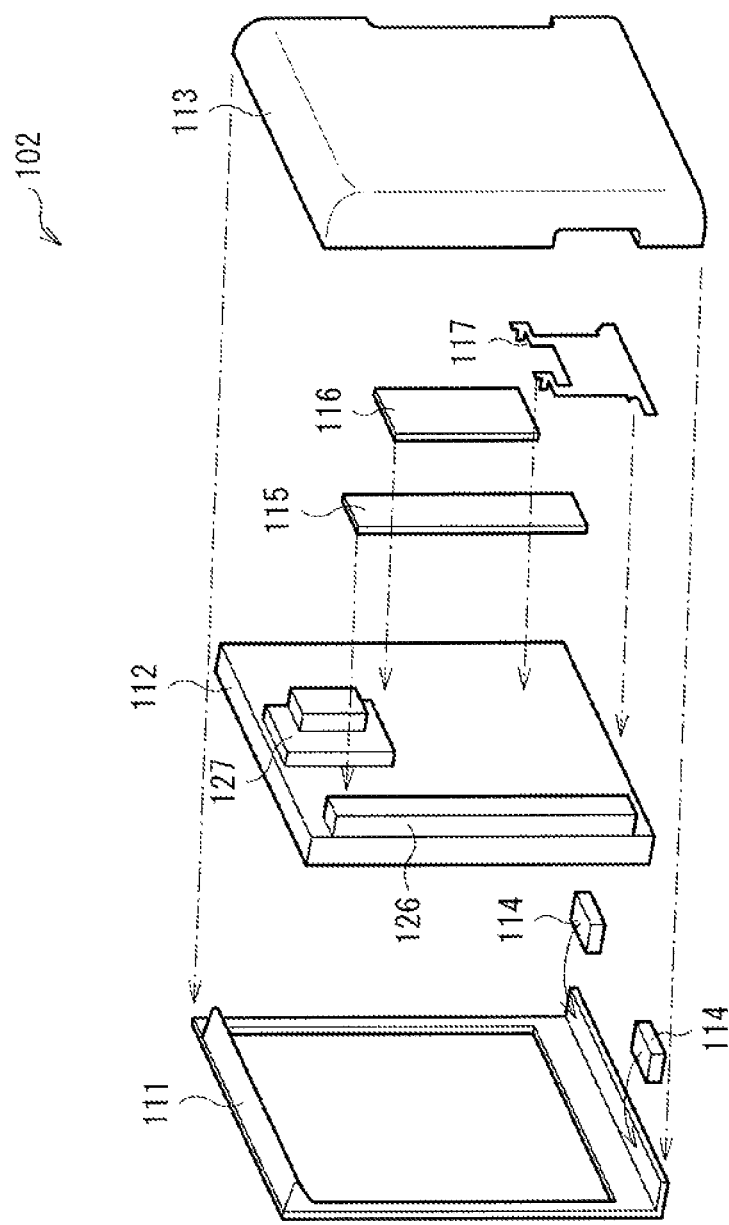

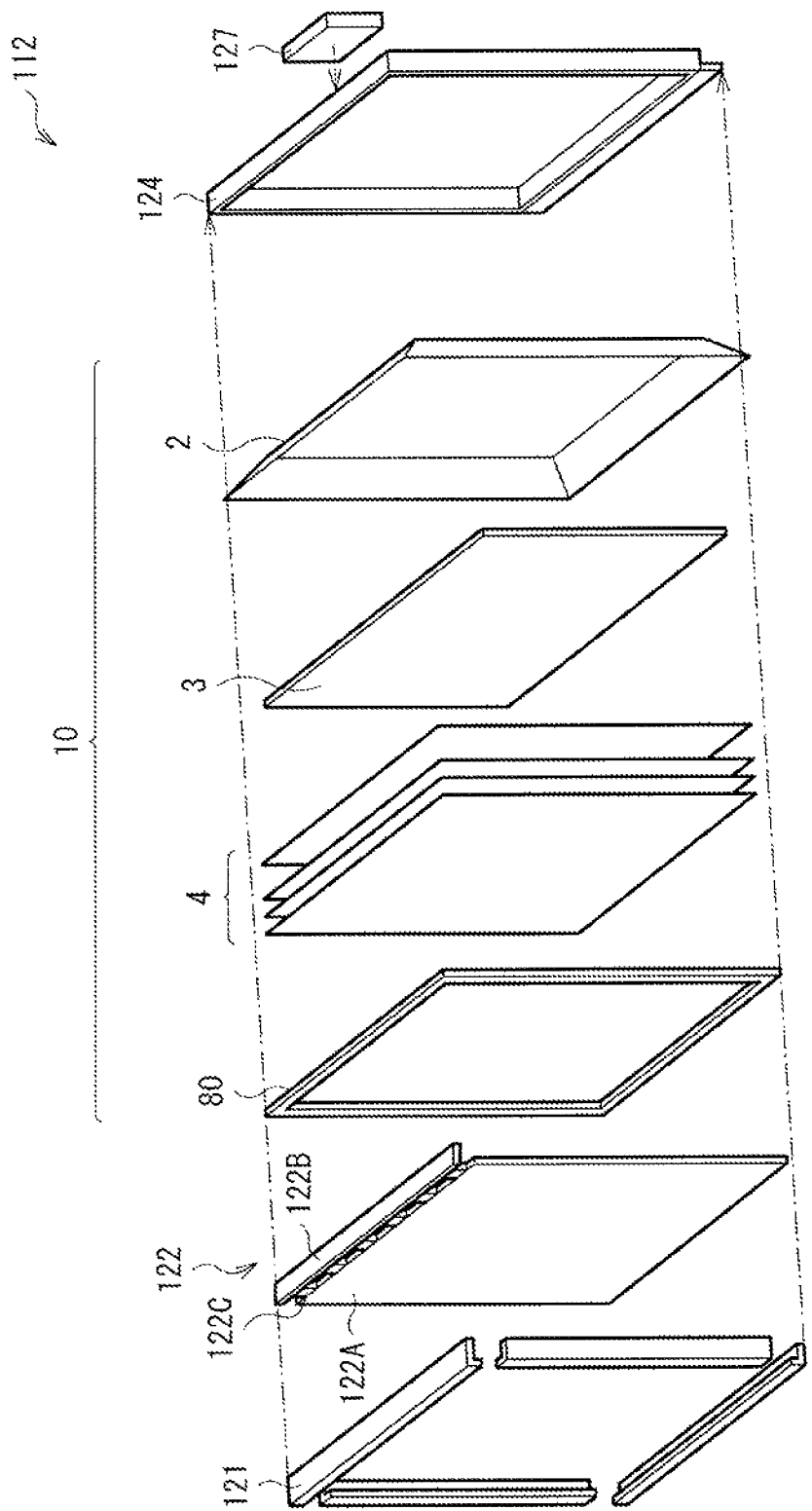
[FIG. 12B]

[ FIG. 13A ]
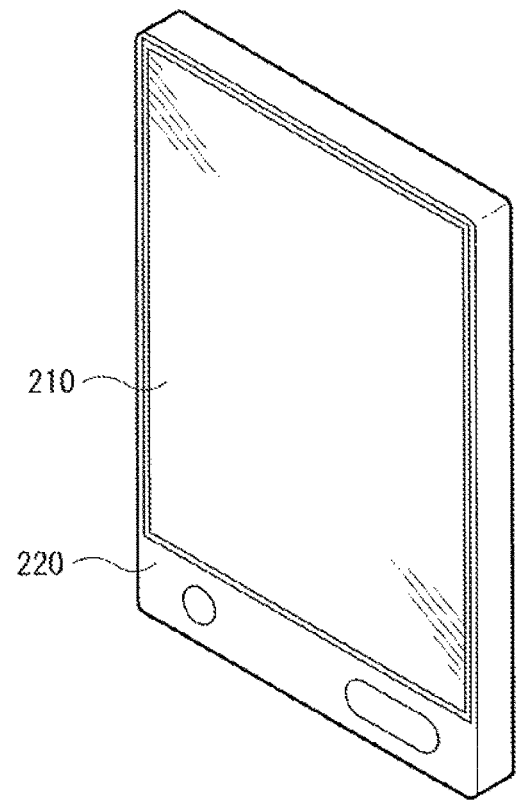
[ FIG. 13B ]
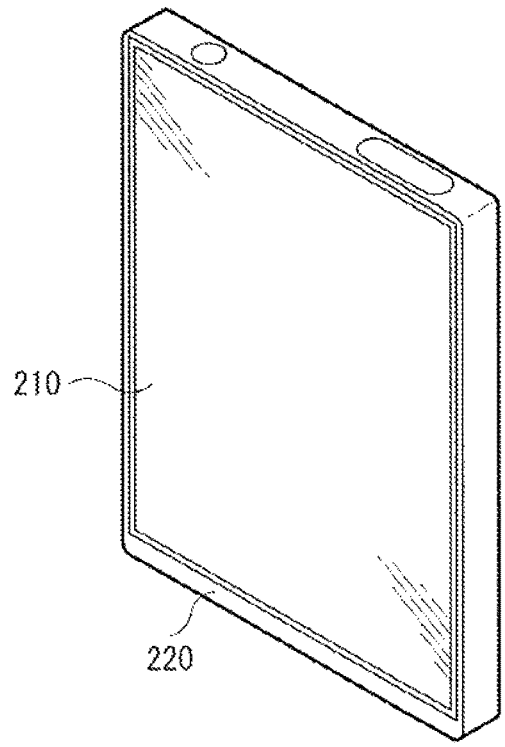

[ FIG. 14 ]
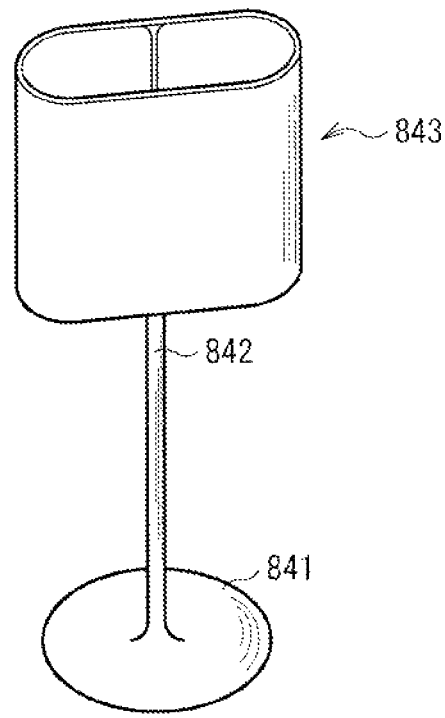
[ FIG. 15 ]
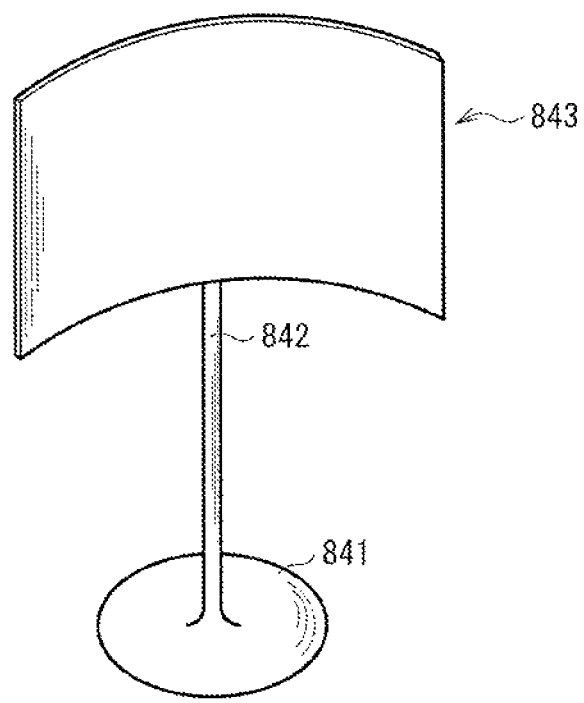

[ FIG. 16 ]
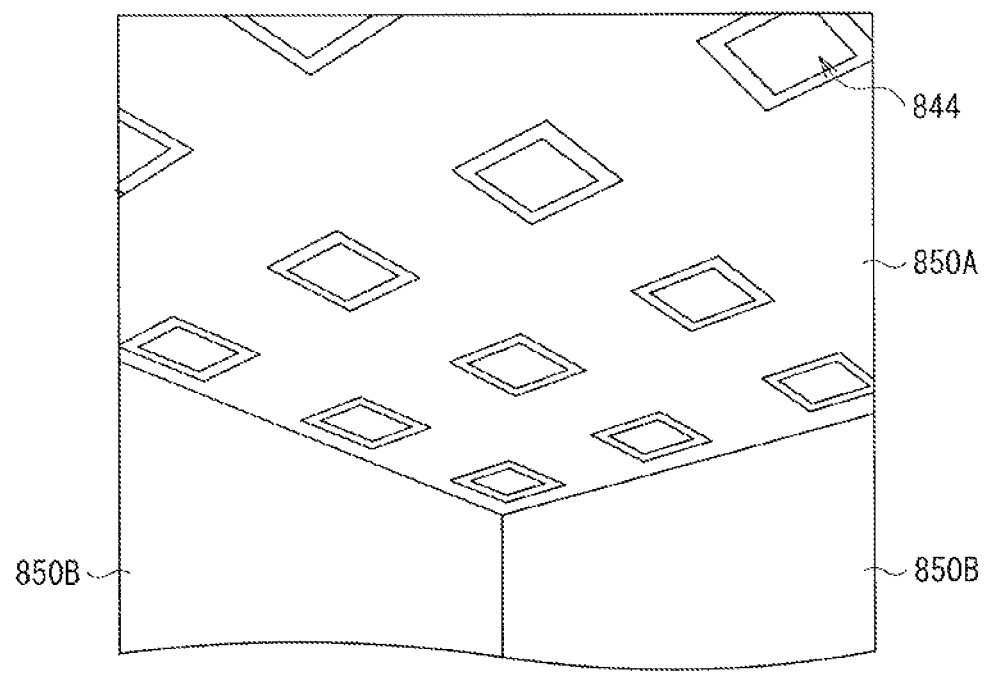

[ FIG. 17 ]
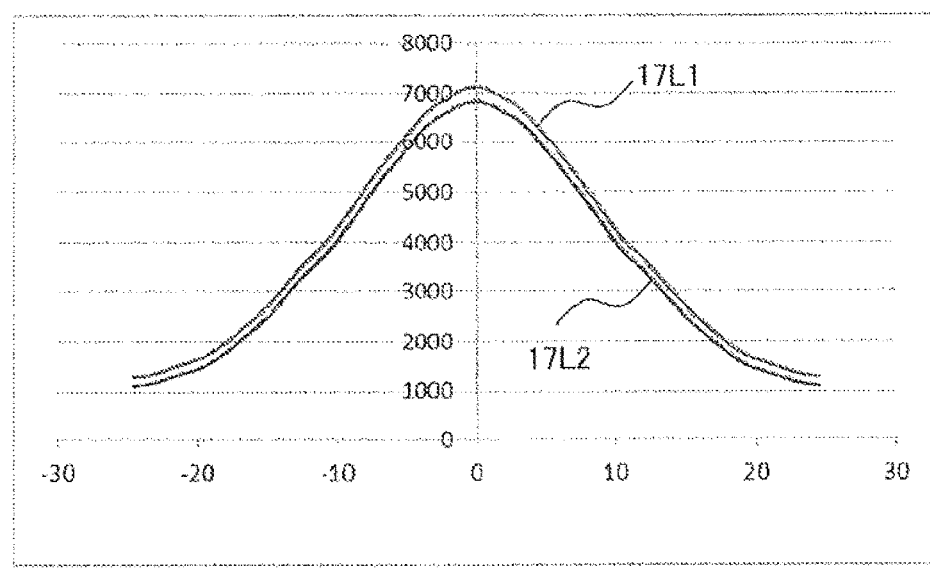

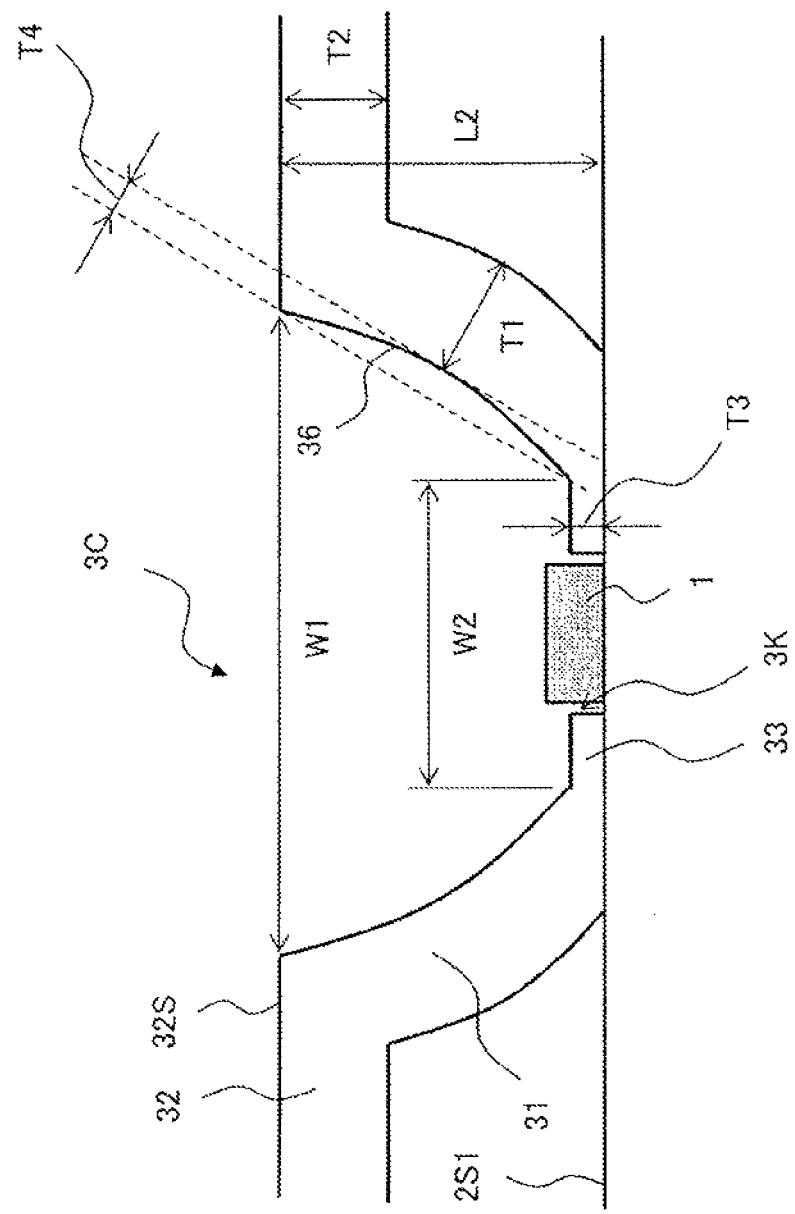
[FIG. 18A]

[ FIG. 18B ]
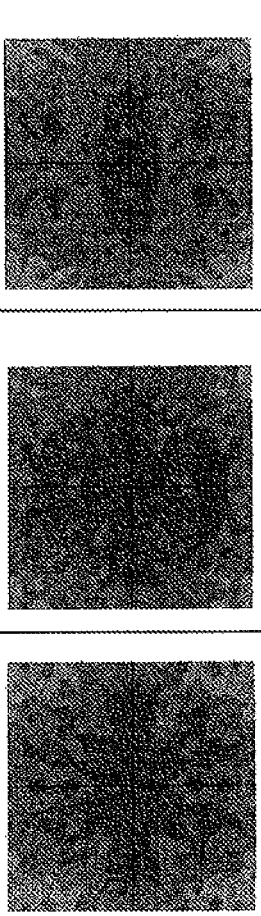

[ FIG. 19 ]
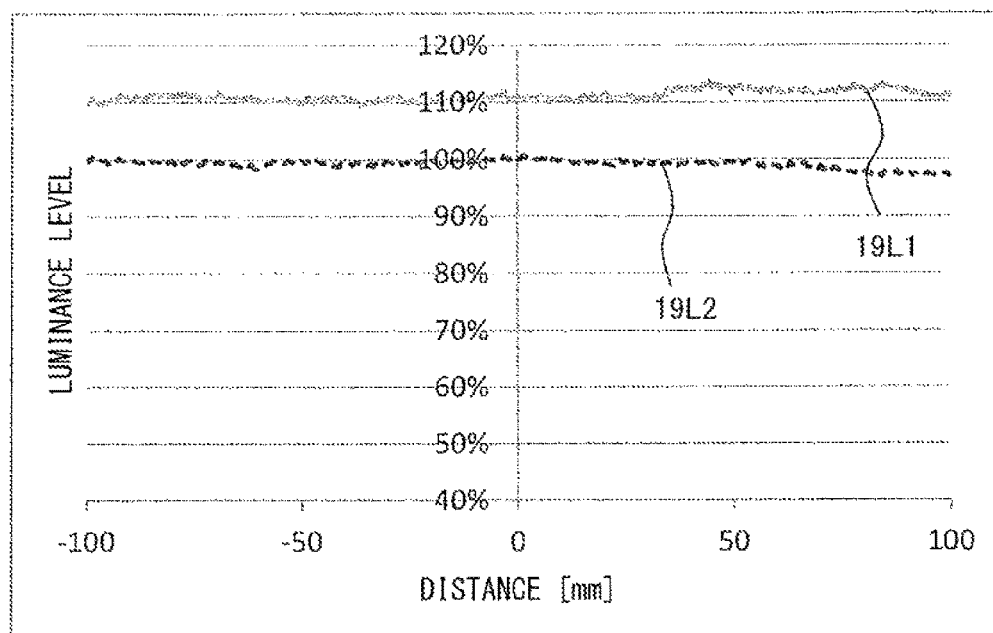

[ FIG. 20A ]
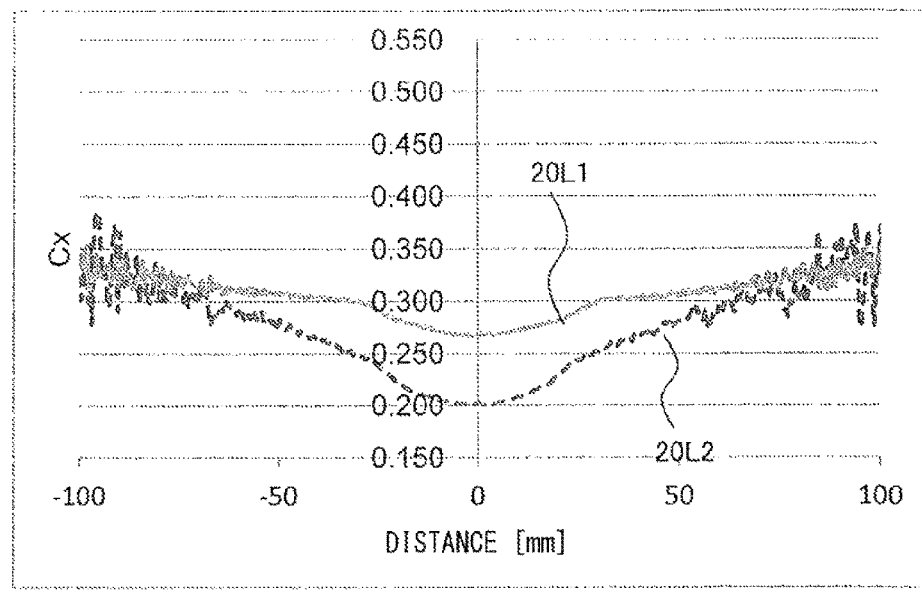
[ FIG. 20B ]
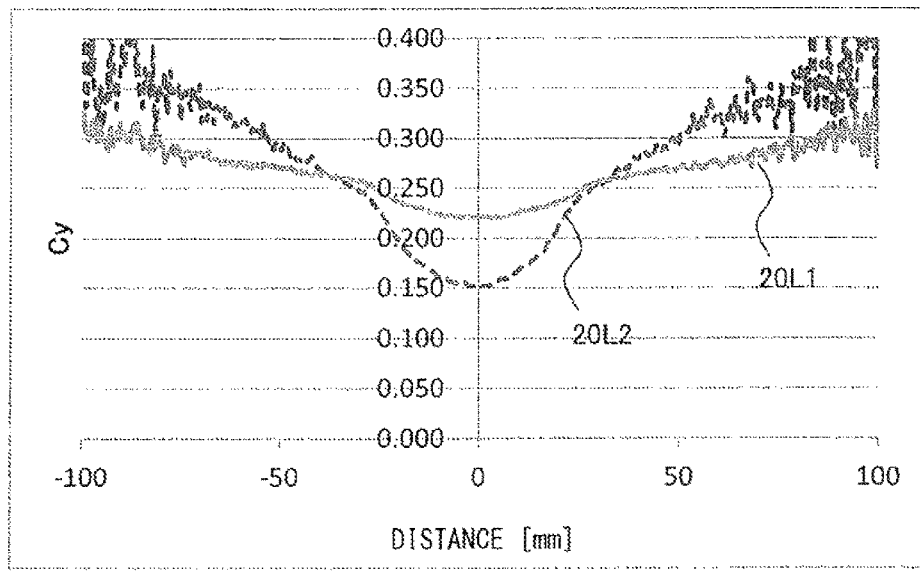

LIGHT-EMITTING DEVICE, DISPLAY APPARATUS, AND LIGHTING APPARATUS

CROSS-REFERENCE TO RELATED APPLICATIONS

This application is a national phase entry under 35 U.S.C. § 371 of International Application No. PCT/JP2016/060178 filed Mar. 29, 2016, which claims the priority from Japanese Patent Application No. 2015-100426, filed in the Japanese Patent Office on May 15, 2015, the entire contents which are hereby incorporated by reference.

TECHNICAL FIELD

The disclosure relates to a light-emitting device, and to a display apparatus and a lighting apparatus that include such a light-emitting device.

BACKGROUND ART

As a direct backlight to be mounted on a liquid crystal display apparatus, a backlight is known that uses a resin-made reflective plate that reflects light from a light source (for example, see PTL 1). PTL 1 attempts to improve the contrast of emitted light with use of the reflective plate.

CITATION LIST

Patent Literature

[PTL 1] Japanese Unexamined Patent Application Publication No. 2012-27382

SUMMARY OF THE INVENTION

However, recently, a light-emitting device has been desired that achieves surface-emitted light having a more uniform luminance distribution while further enhancing the use efficiency of light from a light source despite a compact configuration.

It is therefore desirable to provide a light-emitting device that exhibits superior luminance contribution rate of a light source while reducing in-plane luminance unevenness despite a simple configuration, and a display apparatus and a lighting apparatus that include such a light-emitting device.

A light-emitting device according to an embodiment of the disclosure includes: a substrate on which one or more light sources are provided; and a reflective plate placed on the substrate. Here, the reflective plate includes: an opening into which the light source is inserted; a sloped section that is sloped relative to the substrate while surrounding the opening, and has a first thickness; and a top surface section that is coupled to a top end of the sloped section, and has a second thickness. The first thickness is greater than the second thickness. Further, each of a display apparatus and a lighting apparatus according to respective embodiments of the disclosure includes the above-described light-emitting device.

In the light-emitting device, the display apparatus, and the lighting apparatus according to the respective embodiments of the disclosure, the reflective plate is configured to have the sloped section and the top surface section. Therefore, light emitted from the light source is oriented by the sloped section toward a direction directly above the light source, and is scattered moderately by the top surface section. Further, in the reflective plate, the first thickness of the sloped section is set to be greater than the second thickness of the top surface section. This lowers a light component transmitting the sloped section, of the light emitted from the light source, to improve reflection efficiency on the sloped section.

According to the light-emitting device of the embodiment of the disclosure, it is possible to achieve both improvement in uniformity of the in-plane luminance and improvement in luminance contribution rate of each of the light sources without disturbing weight reduction. In other words, the light-emitting device makes it possible to efficiently emit the light with reduced in-plane luminance unevenness. Therefore, according to the display apparatus with use of the light-emitting device, it is possible to exhibit superior image expression. Further, according to the lighting apparatus with use of the light-emitting device, it is possible to perform more uniform illumination onto an object. It is to be noted that the effects of the disclosure are not limited to the effects described above, and may be any of the effects described hereinbelow.

BRIEF DESCRIPTION OF DRAWINGS

FIG. 1 is a schematic cross-sectional view of an overall configuration example of a light-emitting device according to a first embodiment of the disclosure.

FIG. 2 is an enlarged cross-sectional view of a configuration of a key part of the light-emitting device illustrated in FIG. 1.

FIG. 3 is an enlarged plan view of a planar configuration of a reflective plate of the light-emitting device illustrated in FIG. 1.

FIG. 4 is an enlarged cross-sectional view of a key part configuration of a first modification example of the light-emitting device illustrated in FIG. 1.

FIG. 5 is an enlarged cross-sectional view of a key part configuration of a second modification example of the light-emitting device illustrated in FIG. 1.

FIG. 6A is an enlarged cross-sectional view of a key part configuration of a third modification example of the light-emitting device illustrated in FIG. 1.

FIG. 6B is an enlarged cross-sectional view of a key part configuration of a fourth modification example of the light-emitting device illustrated in FIG. 1.

FIG. 7A is an enlarged cross-sectional view of a key part configuration of a fifth modification example of the light-emitting device illustrated in FIG. 1.

FIG. 7B is an enlarged cross-sectional view of a key part configuration of a sixth modification example of the light-emitting device illustrated in FIG. 1.

FIG. 8A is an enlarged plan view of a key part configuration of the fifth modification example of the light-emitting device illustrated in FIG. 1.

FIG. 8B is an enlarged plan view of a key part configuration of the sixth modification example of the light-emitting device illustrated in FIG. 1.

FIG. 9 is an enlarged plan view of a key part configuration of a seventh modification example of the light-emitting device illustrated in FIG. 1.

FIG. 10 is a schematic cross-sectional view of an overall configuration example of a light-emitting device according to a second embodiment of the disclosure.

FIG. 11 is a perspective view of an external appearance of a display apparatus according to a third embodiment of the disclosure.

FIG. 12A is an exploded perspective view of a main body section illustrated in FIG. 11.

FIG. 12B is an exploded perspective view of a panel module illustrated in FIG. 12A.

FIG. 13A is a perspective view of an external appearance of a tablet terminal apparatus that mounts the display apparatus of the disclosure thereon.

FIG. 13B is a perspective view of an external appearance of another tablet terminal apparatus that mounts the display apparatus of the disclosure thereon.

FIG. 14 is a perspective view of an external appearance of a first lighting apparatus that includes the light-emitting device of the disclosure.

FIG. 15 is a perspective view of an external appearance of a second lighting apparatus that includes the light-emitting device of the disclosure.

FIG. 16 is a perspective view of an external appearance of a third lighting apparatus that includes the light-emitting device of the disclosure.

FIG. 17 is a characteristic diagram illustrating luminance distribution of light from a light source that is determined by simulation in Experimental Examples 1-1 and 1-2.

FIG. 18A is a schematic diagram illustrating a configuration of a reflective plate in a light-emitting device of Experimental Example 2-2.

FIG. 18B is a characteristic diagram illustrating luminance contribution rate and in-plane luminance distribution of light from a light source that are determined by simulation in Experimental Examples 2-1 to 2-3.

FIG. 19 is a characteristic diagram illustrating in-plane luminance distribution in Experimental Examples 4-1 and 4-2.

FIG. 20A is a characteristic diagram illustrating chromaticity distribution in Experimental Examples 4-1 and 4-2.

FIG. 20B is another characteristic diagram illustrating the chromaticity distribution in Experimental Examples 4-1 and 4-2.

MODES FOR CARRYING OUT THE INVENTION

Hereinafter, some embodiments of the disclosure are described in detail with reference to the drawings. It is to be noted that the description is given in the following order.
1. First Embodiment
   A light-emitting device in which a thickness of a sloped section of a reflective plate is greater than a thickness of a top surface section of the reflective plate
2. First Modification Example of First Embodiment
   A light-emitting device in which a high-reflective film is formed on a sloped section of a reflective plate
3. Second Modification Example of First Embodiment
   A light-emitting device in which an uneven structure is provided on a sloped section of a reflective plate
4. Third and Fourth Modification Examples of First Embodiment
   Examples where a sloped section of a reflective plate is configured by a curved surface
5. Fifth and Sixth Modification Examples of First Embodiment
   Examples where an uneven structure is formed on a top surface section of a reflective plate
6. Seventh Modification Example of First Embodiment
   An example where top end edges of adjacent sloped sections of a reflective plate are made to come close to each other
7. Second Embodiment
   An example where light from a light source is subjected to wavelength conversion using a wavelength conversion sheet
8. Third Embodiment (Display Apparatus: Liquid Crystal Display Apparatus)
9. Application Examples of Display Apparatus
10. Application Examples of Lighting Apparatus
11. Experimental Examples 1. First Embodiment

[Configuration of Light-Emitting Device 10]

FIG. 1 is a schematic cross-sectional view of an overall configuration of a light-emitting device 10 according to a first embodiment of the disclosure. FIG. 2 is an enlarged cross-sectional view of a configuration of a key part of the light-emitting device 10 illustrated in FIG. 1. Further, FIG. 3 is an enlarged plan view of a planar configuration of a reflective plate 3 in the light-emitting device 10. It is to be noted that FIG. 1 corresponds to a cross-section in the direction of an arrow taken along a line I-I illustrated in FIG. 3. The light-emitting device 10 is used, for example, as a backlight that illuminates a transmissive liquid crystal panel from behind, or as a lighting apparatus indoors or at any other place.

The light-emitting device 10 includes a substrate 2 on which a plurality of light sources 1 are provided on a top surface 2S1, and the reflective plate 3 that is placed on the substrate 2. The light-emitting device 10 may further include, for example, an optical sheet 4, a stud 5 (see FIG. 1), a drive circuit 6, or any other relevant component part. The drive circuit 6 serves to drive, for example, the light sources 1, and is provided on a rear surface 2S2 of the substrate 2, for example.

In this specification, a direction of a distance connecting the substrate 2 and the optical sheet 4 is designated as a Z-direction (a front-back direction), and a horizontal direction and a vertical direction on principal surfaces (the widest surfaces) of the substrate 2 and the optical sheet 4 are designated as an X-direction and a Y-direction, respectively.

The plurality of light sources 1 are arranged on the top surface 2S1 of the substrate 2 in matrix, for example. The light source 1 is a point light source, and is specifically configured by a light-emitting diode (LED) that oscillates white light. The plurality of light sources 1 are disposed one by one at a plurality of openings 3K that are formed on the reflective plate 3, for example.

The reflective plate 3 has a function of performing optical actions such as reflection, diffusion, and scattering of incident light. The reflective plate 3 includes a bottom surface section 33 where the openings 3K into which the respective light sources 1 are inserted are formed therein; a sloped section 31 that includes a surface 31S that is sloped relative to the substrate 2 while surrounding the openings 3K, and has a thickness T1; and a top surface section 32 that is coupled to a top end of the sloped section 31, and has a thickness T2. Here, the thickness T1 of the sloped section 31 is greater than the thickness T2 of the top surface section 32 (FIG. 2). The bottom surface section 33 is in contact with the top surface 2S1 of the substrate 2, is coupled to a bottom end of the sloped section 31, and has a thickness T3. The top surface section 32 is distant from the substrate 2, and extends along the top surface 2S1, for example. The light source 1 includes a light-emitting point LP at a top end on an optical axis CL. The thickness T3 of the bottom surface section 33 is desirably smaller than a distance L3 from the substrate 2 to the light-emitting point LP, in order not to block light travelling toward the sloped section 31 after being emitted from the light source 1. It is to be noted that the thickness T1 is a dimension of the sloped section 31 in a direction orthogonal to the surface 31S; the thickness T2 is a dimension of the top surface section 32 in a direction orthogonal to a top surface 32S (a surface, of the top surface section 32, facing the optical sheet 4); and the thickness T3 is a dimension of the bottom surface section 33 in a direction orthogonal to the top surface 2S1.

As illustrated in FIG. 3, in an X-Y plane, the opening 3K, a borderline K1 between the bottom surface section 33 and the sloped section 31, and a borderline K2 between the sloped section 31 and the top surface section 32 each have a circular shape, for example. That is, the sloped section 31 has a shape of expanding in a mortar form from the substrate 2 toward the optical sheet 4. However, a planar shape of each of the opening 3K, the borderline K1 between the bottom surface section 33 and the sloped section 31, and the borderline K2 between the sloped section 31 and the top surface section 32 is not limited to the circular shape, and may take any other shapes such as an ellipse and a polygon. It is to be noted that, in the X-Y plane, center points of the opening 3K and the sloped section 31 surrounding the opening 3K may preferably coincide with the optical axis CL of the light source 1.

For the reflective plate 3, the bottom surface section 33, the sloped section 31, and the top surface section 32 may be preferably molded integrally through, for example, cutting-out machining of a plate-like member, or a molding process such as injection molding and thermal press molding. Examples of a constituent material for the reflective plate 3 include acrylic resin such as polycarbonate resin and polymethylmethacrylate resin (PMMA), polyester resin such as polyethylene terephthalate, amorphous copolymerized polyester resin such as a copolymer of methylmethacrylate and styrene (MS), polystyrene resin, and polyvinyl chloride resin.

Because the light-emitting device 10 is provided with the reflective plate 3, light emitted from the light source 1 is reflected on the surface 31S of the sloped section 31 to proceed toward the optical sheet 4, or the light that returns from the optical sheet 4 after being emitted from the light source 1 to reach the optical sheet 4 is reflected, diffused, or scattered on the sloped section 31, the top surface section 32, or the bottom surface section 33 to proceed toward the optical sheet 4. Such an action allows the light-emitting device 10 with the reflective plate 3 mounted thereon to focus light on a region desired to be illuminated while enhancing front luminance with efficient use of light from the light source 1, thus making it possible to achieve improvement of area contrast performance. Further, flattening of the luminance distribution in the X-Y plane is achieved to ensure that a boundary with respect to light from the other adjacent light source 1 does not appear obviously. In particular, in the present embodiment, the sloped section 31 that directly reflects the light emitted from the light source 1 has the thickness T1 that is greater than the thickness T2 of the top surface section 32 and the thickness T3 of the bottom surface section 33. Therefore, even in a case where the reflective plate 3 is configured using the above-described thermoplastic resin that is superior in workability and is relatively lightweight, a light component, of the light having entered the surface 31S of the sloped section 31, transmitting the sloped section 31 is reduced, thus leading to further improvement of the light use efficiency.

For example, as illustrated in FIG. 1, the optical sheet 4 is placed on top of heads of a plurality of studs 5 that are erected on the top surface 32S of the top surface section 32 of the reflective plate 3. The optical sheet 4 is disposed to face the light source 1 and the reflective plate 3 in a manner of covering the plurality of light sources 1 in common. The top surface 32S and a rear surface 4S of the optical sheet 4 are held at a fixed distance L1 by the plurality of studs 5 (see FIG. 1). The optical sheet 30 is configured to laminate, for example, a plurality of sheet-like members such as a diffusion plate, a diffusion sheet, a lens film, and a polarization split sheet. FIG. 1 illustrates such a plurality of sheet-like members as a single laminated structure as a whole. Providing such an optical sheet 4 allows the light emitted from the light source 1 in an oblique direction or the light outgoing from the reflective plate 3 in an oblique direction to rise in a front direction, which makes it possible to further enhance the front luminance.

It is to be noted that, in the light-emitting device 10, a width W1 between top ends of the sloped section 31 ranges, for example, from about 10 mm to about 25 mm; a width W2 between bottom ends of the sloped section 31 ranges, for example, from about 5 mm to about 10 mm; a distance L2 from the surface 2S1 of the substrate 2 to the top surface 32S of the top surface section 32 ranges, for example, from about 5 mm to about 10 mm; and a distance OD from the surface 2S1 of the substrate 2 to the rear surface 4S of the optical sheet 4 ranges, for example, from about 15 mm to about 25 mm.

[Workings and Effects of Light-Emitting Device 10]

Because the light source 1 is a point light source, the light emitted from the light source 1 spreads in all 360-degree directions from the light-emitting point LP of the light source 1, and finally passes through the optical sheet 4 to be observed as emission light on outer side of the optical sheet 4 (on side opposite to the light source 1). Here, in the light-emitting device 10 of the present embodiment, the reflective plate 3 includes the sloped section 31 and the top surface section 32. Consequently, the light emitted from the light source 1 is oriented by the sloped section 31 toward a direction directly above the light source 1, and is scattered moderately by the top surface section 32. Further, in the reflective plate 3, the thickness T1 of the sloped section 31 is set to be greater than the thickness T2 of the top surface section 32. This reduces a light component, of the light emitted from the light source 1, transmitting the sloped section 31, thus leading to improvement of the reflection efficiency on the sloped section 31. Meanwhile, for the top surface section 32 on which the light emitted from the light source 1 is not directly incident, even when the thickness T2 thereof is made smaller than the thickness T1 of the sloped section 31, it is possible to suppress transmittance of incident light in the top surface section 32. In such a manner, in the light-emitting device 10, the thickness in the reflective plate 3 is varied depending on parts, thus making it possible to achieve weight reduction of the reflective plate 3 without sacrificing the reflection efficiency.

According to such a light-emitting device 10, it is possible to achieve both improvement in the uniformity of the in-plane luminance and improvement in luminance contribution rate of each of the light sources 1 without disturbing whole weight reduction. In other words, it is possible to efficiently emit the light with reduced in-plane luminance unevenness despite a simple configuration. Thus, the use of the light-emitting device 10 in a display apparatus makes it possible to achieve enhanced contrast and enhanced luminance, thus allowing superior image expression to be exhibited. Further, the use of the light-emitting device 10 in a lighting apparatus makes it possible to perform more uniform illumination onto an object.

2. First Modification Example of First Embodiment

[Configuration, and Workings and Effects of Reflective Plate 3A]

In the present embodiment, for example, as in a reflective plate 3A as a first modification example illustrated in FIG. 4, a high-reflective film 34 that covers the surface 31S of the sloped section 31 may be provided. The high-reflective film 34 is made of, for example, a material exhibiting higher reflectance than that of a constituent material for the reflective plate 3, such as aluminum (Al) and silver (Ag), and is formed by means of, for example, a vapor-deposition technique and a non-electrolytic plating technique. According to the light-emitting device 10 with use of the reflective plate 3A, it is expected to further improve the luminance contribution rate of each of the light sources 1.

3. Second Modification Example of First Embodiment

[Configuration, and Workings and Effects of Reflective Plate 3B]

Further, in the present embodiment, for example, as in a reflective plate 3B as a second modification example illustrated in FIG. 5, for example, a stepwise uneven structure 35 may be provided on the surface 31S of the sloped section 31. According to the light-emitting device 10 with use of the reflective plate 3B, it is possible to moderately scatter the light from the light source 1 on the uneven structure 35 of the surface 31S, and thus it is expected to further improve the uniformity of the in-plane luminance.

4. Third and Fourth Modification Examples of First Embodiment

[Configuration, and Workings and Effects of Reflective Plate 3C]

In addition, in the present embodiment, for example, as in a reflective plate 3C as a third modification example illustrated in FIG. 6A, a surface of the sloped section 31 may be configured by a curved surface 36. In such a manner that the sloped section 31 has the curved surface 36, it is possible to orient the light emitted from the light source 1 toward a direction directly above the light source 1, for example. Therefore, according to the light-emitting device 10 with use of the reflective plate 3C, it is expected to further improve the luminance contribution rate of each of the light sources 1. It is to be noted that the curved surface 36 is not limited to a concave surface such as a simple spherical surface illustrated in FIG. 6A, and may be alternatively a curved surface 36A formed of an aspherical surface as in a reflective plate 3D as a fourth modification example illustrated in FIG. 6B, for example. Further, as in these reflective plates 3C and 3D, even in a case where the sloped section 31 has the curved surfaces 36 and 36A, the maximum thickness T1 in the sloped section 31 may be preferably made greater than the thickness T2 of the top surface section 32.

5. Fifth and Sixth Modification Examples of First Embodiment

Further, in the present embodiment, for example, as in reflective plates 3E and 3F as a fifth modification example and a sixth modification example respectively illustrated in FIGS. 7A and 8A and FIGS. 7B and 8B, uneven structures 37A and 37B may be provided on the top surface 32S of the top surface section 32. That is, the top surface 32S of the top surface section 32 may preferably have smaller glossiness than that of the surface 31S of the sloped section 31. It is to be noted that the glossiness is to be measured using a gloss meter (see "Japan Industrial Standards JISZ 8741: Specular Glossiness—Methods of Measurement"). The uneven structure 37A illustrated in each of FIGS. 7A and 8A is configured in such a manner that a plurality of hemispherical protrusions 28A are disposed on the top surface 32S. The uneven structure 37B illustrated in each of FIGS. 7B and 8B is configured in such a manner that a plurality of quadrangular-pyramid-like protrusions 28B are disposed on the top surface 32S. It is to be noted that FIGS. 7A and 7B illustrate respectively cross-sections of the reflective plates 3E and 3F, and FIGS. 8A and 8B illustrate planar surfaces of the reflective plates 3E and 3F that are taken along a line VIIIA-VIIIA and a line VIIIB-VIIIB illustrated in FIGS. 7A and 7B, respectively.

In such reflective plates 3E and 3F, light that returns from the optical sheet 4 after being emitted from the light source 1 to reach the optical sheet 4 is scattered moderately on the uneven structures 37A and 37B of the top surface 32S to proceed toward the optical sheet 4. With such an action, according to the light-emitting device 10 with use of these reflective plates 3E and 3F, the front luminance is enhanced with efficient use of the light from the light source 1, and flattening of the luminance distribution in the X-Y plane is achieved. It is to be noted that the uneven structure of the top surface 32S is not limited to any of the uneven structures respectively illustrated in FIGS. 7A and 8A and FIGS. 7B and 8B. For example, the uneven structure may be configured by disposing a plurality of conical protrusions 28C on the top surface 32S.

6. Seventh Modification Example of First Embodiment

Further, in the present embodiment, for example, as in a reflective plate 3G as a seventh modification example illustrated in FIG. 9, the borderlines K2 that are top end edges of the adjacent sloped sections 31 may come close to each other. Such a reflective plate 3G is suitable for a case where the plurality of light sources 1 are disposed on the substrate 2 in higher density.

7. Second Embodiment

[Configuration of Light-Emitting Device 10]

FIG. 10 is a schematic cross-sectional view of an overall configuration of a light-emitting device 20 according to a second embodiment of the disclosure. In the foregoing first embodiment, the description has been given on the example where the white LED is used as the light source 1. In the present embodiment, however, description is given on an example where an LED (for example, a blue LED) that emits light other than the white light is used as the light source.

The light-emitting device 20 further includes a wavelength conversion sheet 7 and a wavelength selection sheet 8. The wavelength conversion sheet 7 and the wavelength selection sheet 8 are provided inside the optical sheet 4, for example. Specifically, for example, the optical sheet 4 has a structure in which a diffusion plate 41, a lens film 42, a polarization split sheet 43, and a protective sheet 44 are laminated in order from side closer to the substrate 2, and the wavelength conversion sheet 7 and the wavelength selection sheet 8 are inserted between the diffusion plate 41 and the lens film 42, for example.

The wavelength conversion sheet 7 improves color-producing properties, for example, by performing wavelength conversion of incident light from the light source 1 to emit the converted light. The wavelength conversion sheet 7 includes a phosphor (a fluorescent material) such as fluorescent pigment and fluorescent dye, or a luminant having a wavelength conversion action such as a quantum dot. The wavelength conversion sheet 7 may be made in such a manner that resin containing the above-described fluorescent material or luminant is processed in a sheet-like form, or is printed at a predetermined region on another transparent substrate. Alternatively, the wavelength conversion sheet 7 may be made in such a manner that a layer of the fluorescent material or luminant is sealed between two transparent films.

The wavelength conversion sheet 7 is excited by light at a first wavelength (hereinafter referred to as first-wavelength light) that is emitted from the light source 1 through a rear surface 71, and performs the wavelength conversion under the principle of fluorescence emission, for example, to emit, from a top surface 72, light at a second wavelength (hereinafter referred to as second-wavelength light) that is different from the first wavelength. Here, the first wavelength and the second wavelength are not particularly limited. However, for example, in the case of a display application, it is preferable that the first wavelength be blue light (for example, a wavelength ranging from about 440 nm to about 460 nm), and the second wavelength be red light (for example, a wavelength ranging from about 620 nm to about 750 nm) or green light (for example, a wavelength ranging from about 495 nm to about 570 nm). In other words, a light source 1B is a blue light source; in such a case, the wavelength conversion sheet 7 performs the wavelength conversion of the blue light into the red light or the green light.

The wavelength conversion sheet 7 desirably includes a quantum dot. The quantum dot is a particle with a long diameter ranging from about 1 nm to about 100 nm, and has a discrete energy level. An energy state of the quantum dot depends on a size thereof, and therefore a change in the size allows for free selection of an emission wavelength. Further, emission light of the quantum dot has a narrow spectrum width. A color gamut is expanded by combining light having such a steep peak. Therefore, the use of the quantum dot as a wavelength conversion material allows the color gamut to be expanded with ease. Moreover, the quantum dot has high responsiveness, thus allowing for efficient use of the light from the light source 1. In addition, the quantum dot exhibits high stability. The quantum dot is, for example, a compound of a group 12 element and a group 16 element, a compound of a group 13 element and a group 16 element, or a compound of a group 14 element and a group 16 element, and examples of the quantum dot include CdSe, CdTe, ZnS, CdS, PdS, PbSe, and CdHgTe.

The wavelength selection sheet 8 is an optical member having a function of mainly transmitting the first-wavelength light (for example, the blue light) and shielding the second-wavelength light (the green light and the red light).

In the light-emitting device 20, in a case where an LED that emits the blue light is used as the light source 1, a blue reflective sheet may be further provided on the reflective plate 3. Alternatively, blue coating may be applied onto the surface 31S and the top surface 32S of the reflective plate 3.

[Workings and Effects of Light-Emitting Device 20]

In the light-emitting device 20, the light emitted from the light source 1 spreads in all 360-degree directions from the light-emitting point LP of the light source 1, and is finally observed as emission light on outer side of the optical sheet 4 (on side opposite to the light source 1). Here, the light-emitting device 20 of the present embodiment is provided with the wavelength conversion sheet 7 and the wavelength selection sheet 8, and therefore the light emitted from the light source 1 exhibits a behavior given below. That is, the light (described as blue light LB here) that is emitted from the light source 1 enters the diffusion plate 41 of the optical sheet 4 directly, or enters the diffusion plate 41 of the optical sheet 4 after being reflected or scattered on the reflective plate 3. The blue light LB having passed through the diffusion plate 41 passes through the wavelength selection sheet 8, and thereafter enters the wavelength conversion sheet 7. The blue light LB having entered the wavelength conversion sheet 7 from the rear surface 71 is converted into red light LR (or green light LG) to be outputted from the top surface 72. However, in some cases, the output light may also include the blue light LB that is not converted into the red light LR (or the green light LG). The output light from the top surface 72 passes through the lens film 42, the polarization split sheet 43, and the protective sheet 44 sequentially. However, return light is present that returns to the wavelength selection sheet 8 without being outputted from the top surface 72. The blue light LLB of the return light enters the wavelength selection sheet 8 once again, and is subjected to the action such as reflection and scattering by the reflective plate 3 to be recycled. Meanwhile, the red light LLR (or the green light LLG) of the return light is reflected by the wavelength selection sheet 8 to pass through the wavelength conversion sheet 7, the lens film 42, the polarization split sheet 43, and the protective sheet 44 sequentially. In such a manner, the light-emitting device 20 allows only the blue light LLB to be recycled, which significantly improves the surrounding coloring at the time of driving of partial lighting without causing degradation in the luminance.

8. Third Embodiment

FIG. 11 illustrates an external appearance of a display apparatus 101 according to a third embodiment of the technology. The display apparatus 101 includes the light-emitting device 10, is used as, for example, a flat-screen television, and has a configuration in which a tabular main body section 102 for image display is supported by a stand 103. It is to be noted that the display apparatus 101 is used as a stationary type that is placed on a horizontal plane such as a floor, a shelf, and a rack, with the stand 103 attached to the main body section 102. However, the display apparatus 101 is also usable as a wall-hanging type, with the stand 103 detached from the main body section 102.

FIG. 12A represents an exploded view of the main body section 102 illustrated in FIG. 11. The main body section 102 includes, for example, a front exterior member (bezel) 111, a panel module 112, and a rear exterior member (rear cover) 113 in this order from front side (viewer side). The front exterior member 111 is a frame-shaped member that covers a front peripheral part of the panel module 112, and a pair of speakers 114 is disposed on lower side thereof. The panel module 112 is fixed to the front exterior member 111. A power supply substrate 115 and a signal substrate 116 are mounted on a rear surface of the panel module 112, and a mounting fixture 117 is fixed to the rear surface of the panel module 112. The mounting fixture 117 serves to mount a wall-mounting bracket, components such as a substrate, and the stand 103. The rear exterior member 113 covers the rear surface and side surfaces of the panel module 112.

FIG. 12B is an exploded view of the panel module 112 illustrated in FIG. 12A. The panel module 112 includes, for example, a front housing (a top chassis) 121, a liquid crystal panel 122, a frame-shaped member (a middle chassis) 80, an optical sheet 4, a reflective plate 3, a substrate 2, a rear housing (a back chassis) 124, and a timing controller substrate 127 in this order from the front side (viewer side).

The front housing 121 is a frame-shaped metallic component that covers a front peripheral part of the liquid crystal panel 122. The liquid crystal panel 122 includes, for example, a liquid crystal cell 122A, a source substrate 122B, and a flexible substrate 122C such as a chip on film (COF) that couples these component parts. The frame-shaped member 123 is a frame-shaped resin-made component that holds the liquid crystal panel 122 and the optical sheet 50. The rear housing 124 is a metallic component made of iron (Fe) or any other meal material that accommodates the liquid crystal panel 122, the frame-shaped member 123, and the light-emitting device 10. The timing controller substrate 127 is also mounted on a rear surface of the rear housing 124.

In the display apparatus 101, image display is performed by causing the liquid crystal panel 122 to selectively transmitting the light from the light-emitting device 10. Here, the display apparatus 101 includes the light-emitting device 10 that achieves improvement in uniformity of the in-plane luminance distribution as described in the first embodiment, thus leading to improvement in the display quality of the display apparatus 101.

It is to be noted that, in the above-described embodiment, the description has been given on a case where the display apparatus 101 includes the light-emitting device 10 according to the first embodiment. However, the display apparatus 101 may include the light-emitting device 20 according to the second embodiment as an alternative to the light-emitting device 10.

9. Application Examples of Display Apparatus

Hereinafter, description is given on examples of application of the display apparatus 101 as described above to electronic apparatuses. Examples of the electronic apparatuses include a television, a digital camera, a notebook personal computer, a mobile terminal apparatus such as a mobile phone, and a video camera. In other words, the above-described display apparatus is applicable to electronic apparatuses in every field that display externally inputted image signals or internally generated image signals as images or video pictures.

FIG. 13A illustrates an external appearance of a tablet terminal apparatus to which the display apparatus 101 of the foregoing embodiment is applicable. FIG. 13B illustrates an external appearance of another tablet terminal apparatus to which the display apparatus 101 of the foregoing embodiment is applicable. Each of these tablet terminal apparatuses includes, for example, a display section 210 and a non-display section 220, and the display section 210 is configured by the display apparatus 101 of the foregoing embodiment.

10. Application Examples of Lighting Apparatus

Each of FIGS. 14 and 15 illustrates an external appearance of a tabletop lighting apparatus to which any of the light-emitting devices 10 and 20 of the foregoing embodiments is applicable. Each of these lighting apparatuses includes, for example, an illuminating section 843 attached to a support post 842 that is provided on a base 841. The illuminating section 843 is configured by any of the light-emitting devices 10 and 20 according, respectively, to the foregoing first and second embodiments. It is possible for the illuminating section 843 to take any shape such as a tubular shape illustrated in FIG. 14 and a curved surface shape illustrated in FIG. 15, by configuring components such as the substrate 2, the reflective plate 3, and the optical sheet 4 in curved shapes.

FIG. 16 illustrates an external appearance of an indoor lighting apparatus to which any of the light-emitting devices 10 and 20 of the foregoing embodiments is applicable. The lighting apparatus includes an illuminating section 844 that is configured by any of the light-emitting devices 10 and 20 according to the foregoing embodiments, for example. The appropriate number of the illuminating sections 844 are disposed at appropriate spacing intervals on a ceiling 850A of a building. It is to be noted that the illuminating section 844 may be installed not only on the ceiling 850A, but also on a wall 850B or a floor (not illustrated in the diagram) depending on the intended use.

In these lighting apparatuses, illumination is performed through the light from the light-emitting devices 10 and 20. Here, the lighting apparatuses include any of the light-emitting devices 10 and 20 that improve the uniformity of the in-plane luminance distribution, thus leading to improvement of illumination quality.

11. Experimental Examples

Experimental Examples 1-1 and 1-2

In the light-emitting device 10 according to the foregoing first embodiment, luminance of light from the single light source 1 to be measured that was observed directly above the light source 1 was determined by simulation. Here, a comparison was made between a case where the thickness T1 of the sloped section 31 was set to 0.5 mm (Experimental Example 1-1) and a case where the thickness T1 of the sloped section 31 was set to 2.0 mm (Experimental Example 1-2). The thickness T2 of the top surface section 32 was set to 0.5 mm in both of these examples. The result is illustrated in FIG. 17. In FIG. 17, a horizontal axis denotes positions in the X-Y plane (FIG. 1), and a vertical axis denotes the luminance. As seen from FIG. 17, luminance determined in Experimental Example 1-2 (a curve line 17L1) was higher than luminance determined in Experimental Example 1-1 (a curve line 17L2). That is, it was confirmed that the luminance achieved from the light-emitting device 10 was enhanced by increasing the thickness of the sloped section.

Experimental Example 2-1

Next, in the light-emitting device 10 with use of the reflective plate 3 illustrated in FIG. 1, in a case where the single light source 1 to be measured, and other thirty-six light sources 1 equivalent to three rounds around the single light source 1 (six in a first round, twelve in a second round, and eighteen in a third round) were turned on, the luminance contribution rate and overall average luminance of the light source 1 to be measured that were observed directly above the light source 1 were determined by simulation. Further, the in-plane luminance distribution at the time when all of the above-described light sources 1 were turned on was determined by simulation.

Experimental Example 2-2

In the light-emitting device 10 with use of the reflective plate 3C illustrated in FIG. 18A, a simulation similar to that of Experimental Example 2-1 was performed. Here, dimensions were specified such that the width W1 was 16.00 mm, the width W2 was 8.00 mm, the distance L2 was 7.00 mm, and a depth T4 of a slant surface 36 was 1.00 mm (a curvature R of the slant surface 36 was 14.9 mm).

Experimental Example 2-3

With the exception that the depth T4 of the slant surface 36 was set to 1.35 mm, any other conditions were similar to those of Experimental Example 2-2. Under such conditions, the luminance contribution rate and overall average luminance of the light source 1 to be measured were determined by simulation. Further, the in-plane luminance distribution at the time when all of the light sources 1 were turned on was determined by simulation.

The simulation result of each Experimental Example is summarized in FIG. 18B. As illustrated in FIG. 18B, as compared with Experimental Example 2-1 with use of the reflective plate 3 having the flat surface 31S, directly-overhead luminance contribution rate was improved in Experimental Examples 2-2 and 2-3 with use of the reflective plate 3C having the slant surface 36 that is formed as a curved surface. In other words, the light-collecting effect was obtained by causing curvature in the slant surface of the sloped section, thus leading to improvement of the directly-overhead luminance contribution rate. Therefore, it was found that causing curvature in the slant surface of the sloped section was expected to be utilized as a technique of improving the contrast performance. Further, in Experimental Example 2-2, it was found that variations in the in-plane luminance were reduced as compared with Experimental Examples 2-1 and 2-3. It is to be noted that the in-plane luminance distribution in FIG. 18B indicates that a part occupied by a deep color has higher luminance than that of a part occupied by a light color. Further, the directly-overhead luminance contribution rate as is defined here refers to a rate of the luminance at the time when one light source or a block of light sources is turned on in a case where the luminance at the time when all light sources are turned on is specified as 100%. The numerical values of the directly-overhead luminance contribution rate and the average luminance in FIG. 18B are standardized under the condition that the result of Experimental Example 2-1 is defined as 1.

Experimental Example 3

A sample of the light-emitting device 10 that includes a reflective plate corresponding to the reflective plate 3E of the fifth modification example of the first embodiment was produced, and the luminance distribution thereof was evaluated. Here, the in-plane luminance distribution was observed in a case where any single light source 1, and other thirty-six light sources 1 equivalent to three rounds around the single light source 1 (six in a first round, twelve in a second round, and eighteen in a third round) were turned on. The top surface of a top surface section of the reflective plate was subjected to a cutting process to achieve scattering close to complete scattering. As a result, according to the present Experimental Example, it was confirmed that so-called particulate variability was reduced, and a difference in the luminance between a region directly above a light source and a clearance region of light sources was decreased, as compared with the case of a reflective plate with the flat top surface of the top surface section. Further, in the present experimental example, it was confirmed that the distance OD was reducible by about 22%, which was suitable for reduction in a thickness of a light source device, in comparison with a typical structure with no use of a reflective plate.

Experimental Examples 4-1 and 4-2

A sample of the light-emitting device 20 according to the foregoing second embodiment was produced (Experimental Example 4-1). Further, a sample of a light-emitting device that removed the wavelength selection sheet 8 from the configuration of the light-emitting device 20 was produced (Experimental Example 4-2).

For each of the samples in these Experimental Examples 4-1 and 4-2, the in-plane luminance distribution was measured. The results are illustrated in FIG. 19. In FIG. 19, a horizontal axis denotes a distance [mm] from a light emission center of the light source 1, and a vertical axis denotes a luminance level (a relative value). Further, in FIG. 19, a curved line 19L1 indicates a luminance distribution of Experimental Example 4-1, and a curved line 19L2 indicates a luminance distribution of Experimental Example 4-2. As illustrated in FIG. 19, in a case where the wavelength selection sheet 8 was provided (Experimental Example 4-1), a luminance increase of about 10% was observed as compared with a case where the wavelength selection sheet 8 was not provided (Experimental Example 4-2).

In addition, for each of the samples in these Experimental Examples 4-1 and 4-2, the chromaticity distribution in an in-plane direction was measured at the time when turning on only the single light source 1 configured by an LED. The results are illustrated in FIGS. 20A and 20B. In FIG. 20A, a horizontal axis denotes a distance [mm] from a light emission center of the light source 1, and a vertical axis denotes chromaticity x. In FIG. 20B, a horizontal axis denotes a distance [mm] from a light emission center of the light source 1, and a vertical axis denotes the chromaticity x. Further, in each of FIGS. 20A and 20B, a curved line 20L1 indicates a chromaticity distribution of Experimental Example 4-1, and a curved line 20L2 indicates a chromaticity distribution of Experimental Example 4-2. As illustrated in FIGS. 20A and 20B, in a case where the wavelength selection sheet 8 was provided (Experimental Example 4-1), the steepness of chromaticity variation at the time of turning on the single light source 1 was reduced, thus leading to further improvement of the screen display quality, as compared with a case where the wavelength selection sheet 8 was not provided (Experimental Example 4-2).

The disclosure has been described heretofore with reference to the embodiments, the modification examples, and the experimental examples thereof; however, the disclosure is not limited to the foregoing embodiments, modification examples, and experimental examples, and may be modified in a variety of ways. For example, a material and a thickness of each member described in the foregoing embodiments, modification examples, and experimental examples are not limited thereto, and any other material and thickness may be used. Further, the shape of a surface of the sloped section in the reflective plate, and the uneven structure of a top surface of the top surface section are not limited to those in the foregoing embodiments, modification examples, and experimental examples.

Further, for example, in the foregoing embodiments, the description has been given on the case where the light source 1 is an LED; however, the light source 1 may be configured by a device such as a semiconductor laser.

Additionally, for example, in the foregoing embodiments, modification examples, and experimental examples, the description has been given by citing, as a specific example, configurations of the light-emitting device 10 and the display apparatus 101 (the television); however, it is unnecessary to provide all of the components, or other components may be provided.

It is to be noted that the effects described herein are merely illustrative and non-limiting, and may further include other effects. Further, the technology may have the following configurations.

(1)

A light-emitting device including:

a substrate on which one or more light sources are provided; and a reflective plate placed on the substrate, in which the reflective plate includes an opening into which the light source is inserted, a sloped section sloped relative to the substrate while surrounding the opening, the sloped section having a first thickness, and a top surface section coupled to a top end of the sloped section, the top surface section having a second thickness, and the first thickness is greater than the second thickness.

(2)

The light-emitting device according to (1), in which the reflective plate further includes a bottom surface section that includes the opening and is coupled to a bottom end of the sloped section, the bottom surface section having a third thickness, and the third thickness is smaller than the first thickness.

(3)

The light-emitting device according to (2), in which the light source has a light-emitting point, and the third thickness is smaller than a distance from the substrate to the light-emitting point.

(4)

The light-emitting device according to (2) or (3), in which the reflective plate is configured in such a manner that the bottom surface section, the sloped section, and the top surface section are molded integrally.

(5)

The light-emitting device according to any one of (1) to (4), in which the top surface section includes a top surface extending along the substrate, and the top surface includes one or both of a concave part and a convex part.

(6)

The light-emitting device according to any one of (1) to (5), in which the reflective plate further includes a reflective film that covers the sloped section.

(7)

The light-emitting device according to any one of (1) to (6), in which the sloped section includes a concave surface.

(8)

The light-emitting device according to any one of (1) to (7), in which the sloped section includes an inner surface having a first glossiness, and the top surface section includes a top surface having a second glossiness smaller than the first glossiness.

(9)

The light-emitting device according to any one of (1) to (8), further including a light diffusion member provided on side opposite to the substrate, with the reflective plate being interposed in between.

(10)

A display apparatus provided with a liquid crystal panel and a light-emitting device on backside of the liquid crystal panel, the light-emitting device including:

a substrate on which a light source is provided; and a reflective plate placed on the substrate, in which the reflective plate includes an opening into which the light source is inserted, a sloped section sloped relative to the substrate while surrounding the opening, the sloped section having a first thickness, and a top surface section coupled to a top end of the sloped section, the top surface section having a second thickness, and the first thickness is greater than the second thickness.

(11)

A lighting apparatus provided with a light-emitting device, the light-emitting device including:

a substrate on which one or more light sources are provided; and a reflective plate placed on the substrate, in which the reflective plate includes an opening into which the light source is inserted, a sloped section sloped relative to the substrate while surrounding the opening, the sloped section having a first thickness, and a top surface section coupled to a top end of the sloped section, the top surface section having a second thickness, and the first thickness is greater than the second thickness.

The present application is based upon and claims priority from Japanese Patent Application No. 2015-100426 filed with the Japan Patent Office on May 15, 2015, the entire contents of which are herein incorporated by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A light-emitting device comprising:

a substrate on which one or more light sources are provided; and a reflective plate placed on the substrate, wherein the reflective plate includes an opening into which the light source is inserted, a sloped section sloped relative to the substrate while surrounding the opening, the sloped section having a first thickness, and a top surface section coupled to a top end of the sloped section, the top surface section having a second thickness, and the first thickness is greater than the second thickness.

2. The light-emitting device according to claim 1, wherein the reflective plate further includes a bottom surface section that includes the opening and is coupled to a bottom end of the sloped section, the bottom surface section having a third thickness, and the third thickness is smaller than the first thickness.

3. The light-emitting device according to claim 2, wherein
the light source has a light-emitting point, and
the third thickness is smaller than a distance from the substrate to the light-emitting point.

4. The light-emitting device according to claim 2, wherein the reflective plate is configured in such a manner that the bottom surface section, the sloped section, and the top surface section are molded integrally.

5. The light-emitting device according to claim 1, wherein
the top surface section includes a top surface extending along the substrate, and
the top surface includes one or both of a concave part and a convex part.

6. The light-emitting device according to claim 1, wherein the reflective plate further includes a reflective film that covers the sloped section.

7. The light-emitting device according to claim 1, wherein the sloped section includes a concave surface.

8. The light-emitting device according to claim 1, wherein
the sloped section includes an inner surface having a first glossiness, and
the top surface section includes a top surface having a second glossiness smaller than the first glossiness.

9. The light-emitting device according to claim 1, further comprising a light diffusion member provided on side opposite to the substrate, with the reflective plate being interposed in between.

10. A display apparatus provided with a liquid crystal panel and a light-emitting device on backside of the liquid crystal panel, the light-emitting device comprising:
a substrate on which a light source is provided; and
a reflective plate placed on the substrate, wherein
the reflective plate includes
an opening into which the light source is inserted,
a sloped section sloped relative to the substrate while surrounding the opening, the sloped section having a first thickness, and
a top surface section coupled to a top end of the sloped section, the top surface section having a second thickness, and
the first thickness is greater than the second thickness.

11. A lighting apparatus provided with a light-emitting device, the light-emitting device comprising:
a substrate on which one or more light sources are provided; and
a reflective plate placed on the substrate, wherein
the reflective plate includes
an opening into which the light source is inserted,
a sloped section sloped relative to the substrate while surrounding the opening, the sloped section having a first thickness, and
a top surface section coupled to a top end of the sloped section, the top surface section having a second thickness, and
the first thickness is greater than the second thickness.

* * * * *